United States Patent
Lu et al.

(10) Patent No.: US 12,129,749 B1
(45) Date of Patent: Oct. 29, 2024

(54) METHODS FOR REMOVING CARBON DIOXIDE FROM NATURAL GAS

(71) Applicant: SAUDI ARABIAN OIL COMPANY, Dhahran (SA)

(72) Inventors: Peng Lu, Dhahran (SA); Pan Luo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/359,615

(22) Filed: Jul. 26, 2023

(51) Int. Cl.
*E21B 43/16* (2006.01)
*C09K 8/84* (2006.01)

(52) U.S. Cl.
CPC .............. *E21B 43/16* (2013.01); *C09K 8/845* (2013.01)

(58) Field of Classification Search
CPC ........................................................ E21B 43/40
See application file for complete search history.

(56) References Cited

U.S. PATENT DOCUMENTS

| | | | |
|---|---|---|---|
| 4,444,258 A * | 4/1984 | Kalmar | E21B 43/40 166/267 |
| 4,981,394 A * | 1/1991 | McLaren | C09K 17/02 405/129.65 |
| 7,722,850 B2 | 5/2010 | Geerlings et al. | |
| 8,637,299 B2 | 1/2014 | Heichberger | |
| 8,899,331 B2 | 12/2014 | Burnham et al. | |
| 9,057,249 B2 | 6/2015 | Keller et al. | |
| 2004/0048742 A1 | 3/2004 | Chin | |
| 2004/0200618 A1 | 10/2004 | Piekenbrock | |

FOREIGN PATENT DOCUMENTS

| | | |
|---|---|---|
| CA | 2718885 A1 | 11/2009 |
| WO | 2010097449 A1 | 9/2010 |
| WO | 2021138653 A1 | 7/2021 |

OTHER PUBLICATIONS

Liu, F., Lu, P., Zhu, C., and Xiao, Y. (2011). Coupled reactive flow and transport modeling of CO2 sequestration in the Mt. Simon sandstone formation, Midwest USA. International Journal of Greenhouse Gas Control, 5(2), 294-307.
Rambaran, K. D., Chin Chee Fat, S. T., & Layne, L. E. (Jun. 2018). Exploiting Water Injection Techniques for Increasing Gas Recovery in Conventional Gas Reservoirs. In SPE Trinidad and Tobago Section Energy Resources Conference. OnePetro. SPE-191206-MS.

* cited by examiner

*Primary Examiner* — William D Hutton, Jr.
*Assistant Examiner* — Avi T Skaist
(74) *Attorney, Agent, or Firm* — Vorys, Sater, Seymour and Pease LLP

(57) ABSTRACT

Methods of the present disclosure may include obtaining an origin fluid having a calcium concentration of about 1.5 M or greater. A treatment fluid may be created by introducing an amount of slaked lime to the origin fluid to change a pH of the resulting treatment fluid to about 11 or greater. The treatment fluid may be introduced into a subterranean formation containing a formation gas comprising natural gas and carbon dioxide. The calcium in the treatment fluid may be allowed to react with the carbon dioxide within the subterranean formation to form calcite. The treated formation gas may be removed from the subterranean formation after the formation of calcite, wherein the concentration of carbon dioxide in the treated formation gas is lower than the formation gas before it was contacted with the treatment fluid.

20 Claims, 25 Drawing Sheets

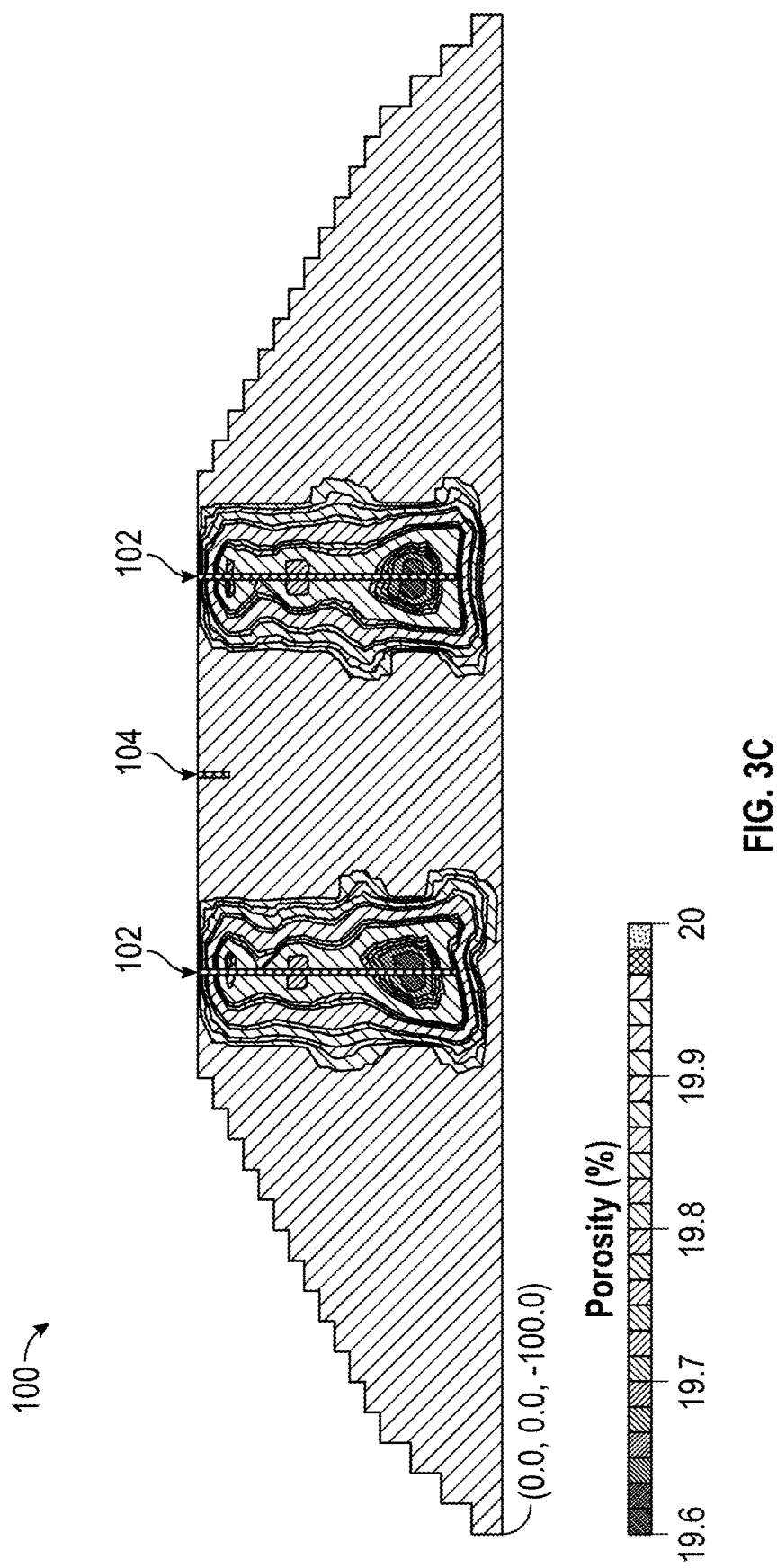

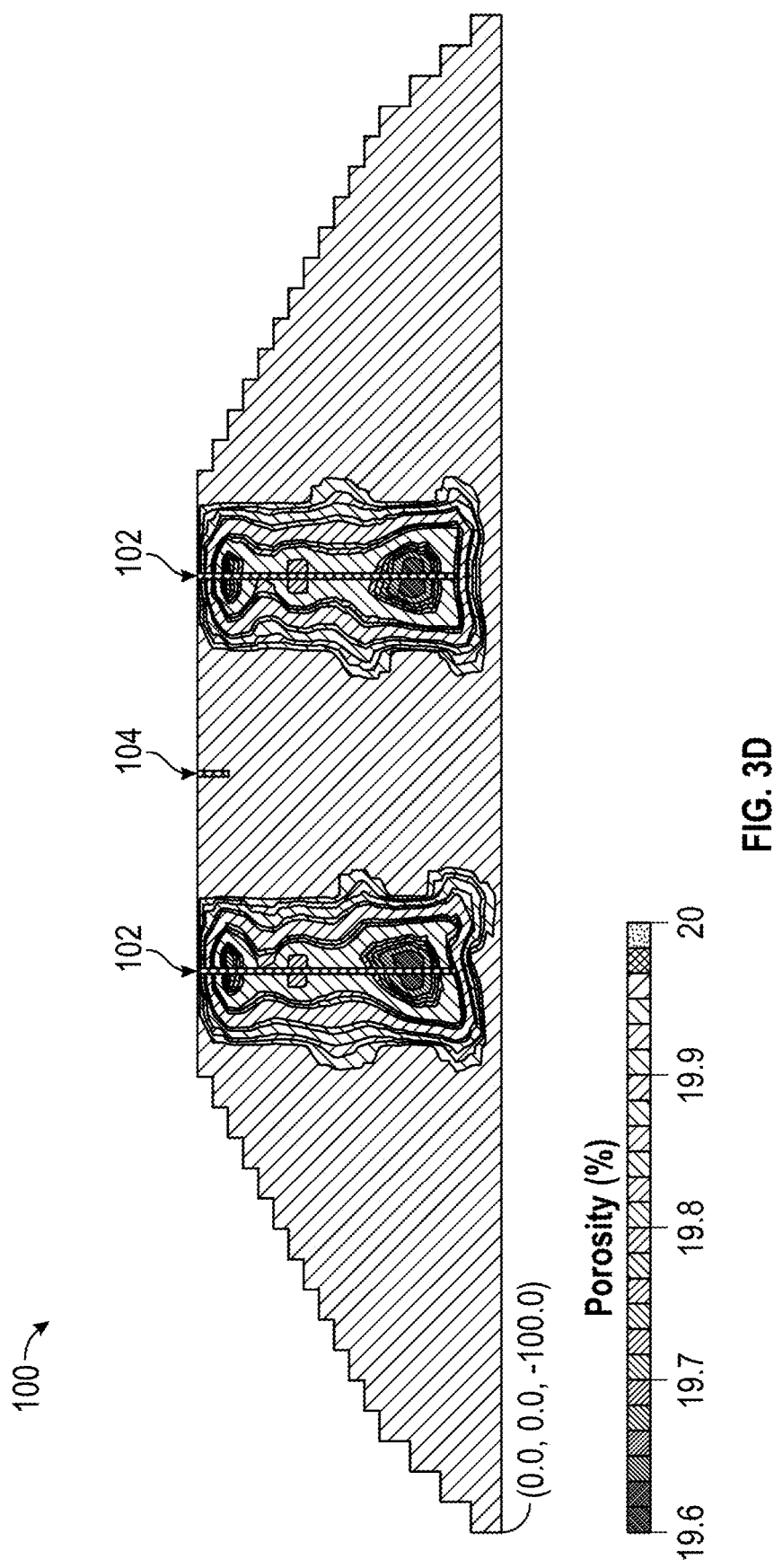

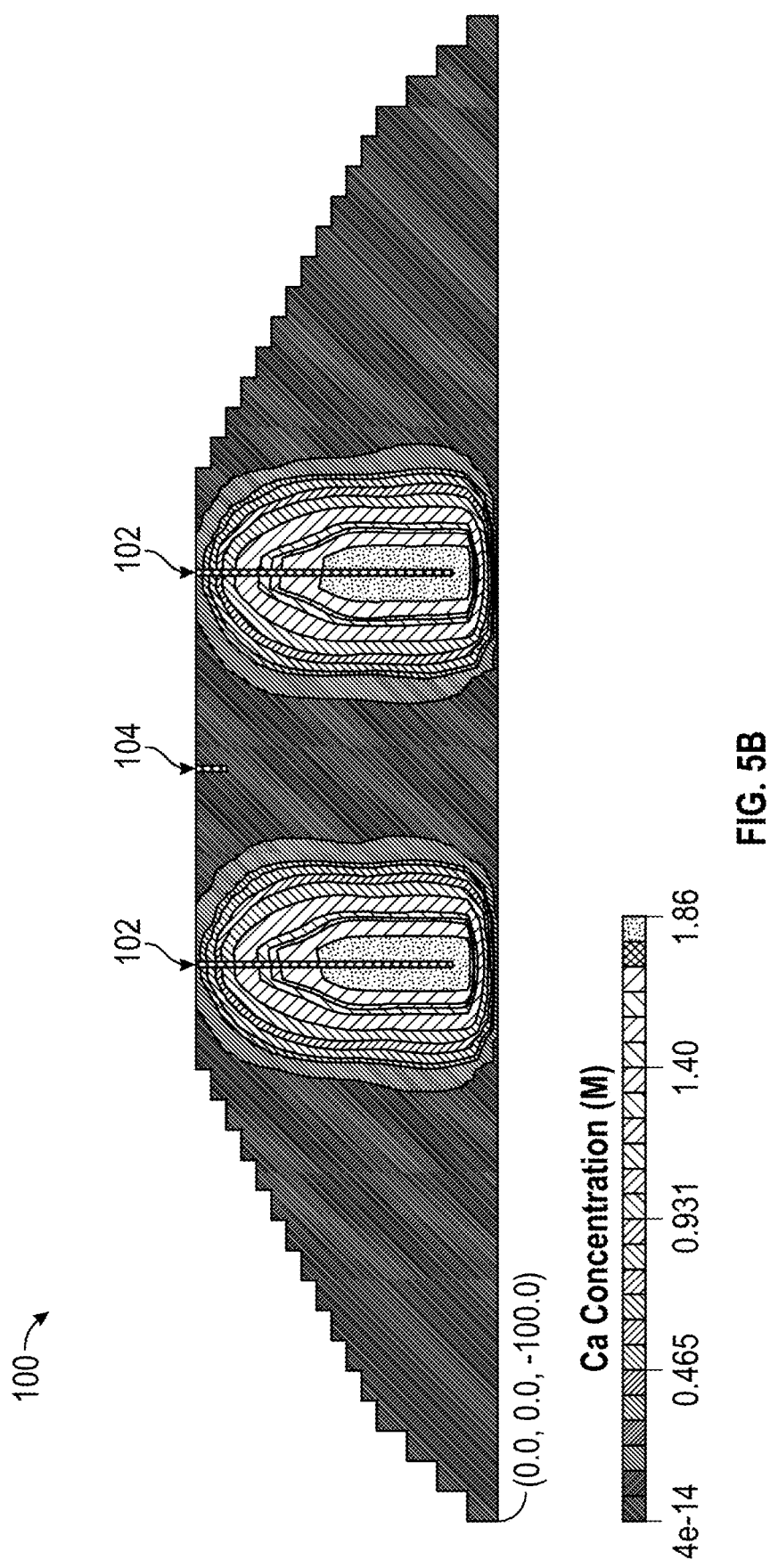

METHODS FOR REMOVING CARBON DIOXIDE FROM NATURAL GAS

FIELD OF THE DISCLOSURE

The present disclosure relates generally to carbon sequestration and, more particularly, to removing carbon dioxide from natural gas in situ.

BACKGROUND OF THE DISCLOSURE

Climate change and the relationship between climate change and increased atmospheric carbon dioxide concentrations have sparked immense scientific interest due to the possible significant environmental impact. Anthropogenic activities, including natural gas extraction and use, have been linked to the increase of carbon dioxide emissions, which further exacerbates the global climate crisis. Because some natural gas reservoirs contain substantial amounts of carbon dioxide, the extraction of the natural gas from these reservoirs may potentially contribute to the elevated atmospheric carbon dioxide concentrations as carbon dioxide will be co-produced with the extracted gas. Furthermore, the presence of carbon dioxide in the natural gas can reduce the heat value of the natural gas, thereby lowering the energy output upon combustion. As a result, separation or removal of the carbon dioxide from the natural gas is recommended to mitigate potential environmental releases and enhance energy efficiency.

Traditional geology carbon sequestration involves the injection of superficial carbon dioxide into saline aquifers or depleted oil and gas reservoirs, storing the carbon dioxide subsurface. Carbon dioxide may be trapped in underground reservoirs by four storage mechanisms: structural trapping, residual carbon dioxide trapping, solubility trapping, and mineral trapping. Mineral trapping is recognized as the most secure carbon capture and storage mechanism to ensure the long-term retention of carbon dioxide following injection into permeable, porous subterranean formations. However, mineral trapping is an extremely slow process that may take thousands of years to fully capture the circulating carbon dioxide due to the strongly acidified zones produced by the dissolved carbon dioxide. Moreover, it would be beneficial to remove carbon dioxide from the natural gas downhole before the natural gas reaches the wellhead.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, methods may include obtaining an origin fluid having a calcium concentration of about 1.5 M or greater; creating treatment fluid by introducing an amount of slaked lime to the origin fluid to change a pH of the resulting treatment fluid to about 11 or greater; wherein the amount of slaked lime is a second output of a reactive transport model; introducing the treatment fluid into a subterranean formation containing a formation gas comprising natural gas and carbon dioxide; wherein a rate of introduction of the treatment fluid into the subterranean formation is a third output of the reactive transport model; allowing the calcium in the treatment fluid to react with the carbon dioxide within the subterranean formation to form calcite; and removing the treated formation gas from the subterranean formation after the formation of calcite, wherein the concentration of carbon dioxide in the treated formation gas is lower than the formation gas before it was contacted with the treatment fluid.

In another embodiment, methods may include obtaining a calcium-lean aqueous fluid having a calcium concentration of less than about 1.5 M; continuously introducing an amount of calcium chloride to the calcium-lean aqueous fluid to obtain an aqueous fluid having a calcium concentration of about 1.5 M or greater; wherein the amount of calcium chloride is a first output of a reactive transport model; continuously introducing an amount of slaked lime to the aqueous fluid to change a pH of the aqueous fluid to about 11 or greater; wherein the amount of slaked lime is a second output of the reactive transport model; after changing the pH of the aqueous fluid, continuously introducing the aqueous fluid into a subterranean formation containing a gas comprising natural gas and carbon dioxide; wherein a rate of introduction of the aqueous fluid into the subterranean formation is a third output of the reactive transport model; allowing the calcium in the aqueous fluid to react with the carbon dioxide to form calcite; wherein a concentration of carbon dioxide in the gas is lower after the formation of calcite; and removing the gas from the subterranean formation after the formation of calcite.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIGS. 3A-3D are heat maps obtained by reactive transport modeling representing the porosity of a subterranean formation at different time points post-natural gas production.

FIGS. 5A-5D are heat maps obtained by reactive transport modeling representing the calcium concentration distribution of a subterranean formation at different time points post-natural gas production.

DETAILED DESCRIPTION

Figure 1A:
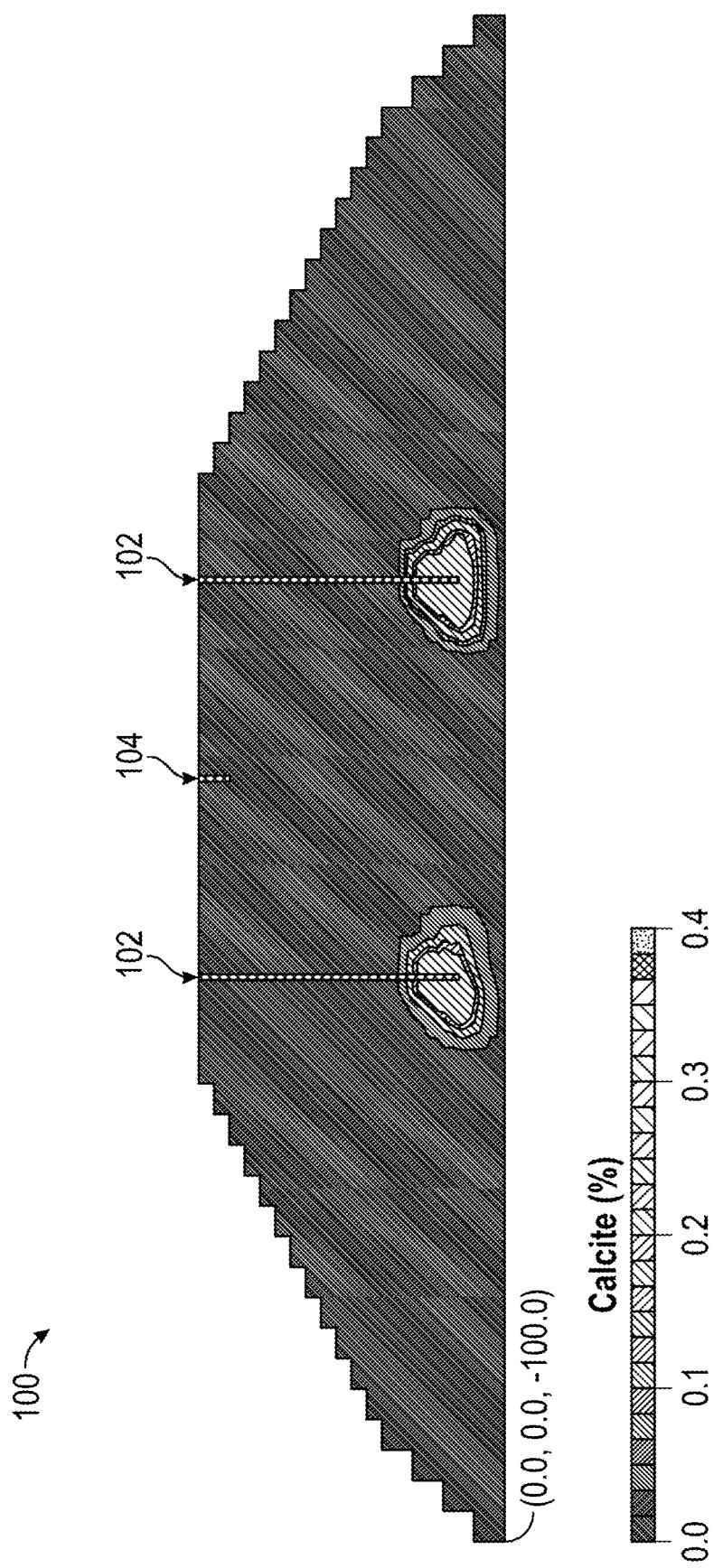
FIGS. 1A-1D are heat maps obtained by reactive transport modeling representing the calcite distribution of a subterranean formation at different time points post-natural gas production.
Figure 1B:
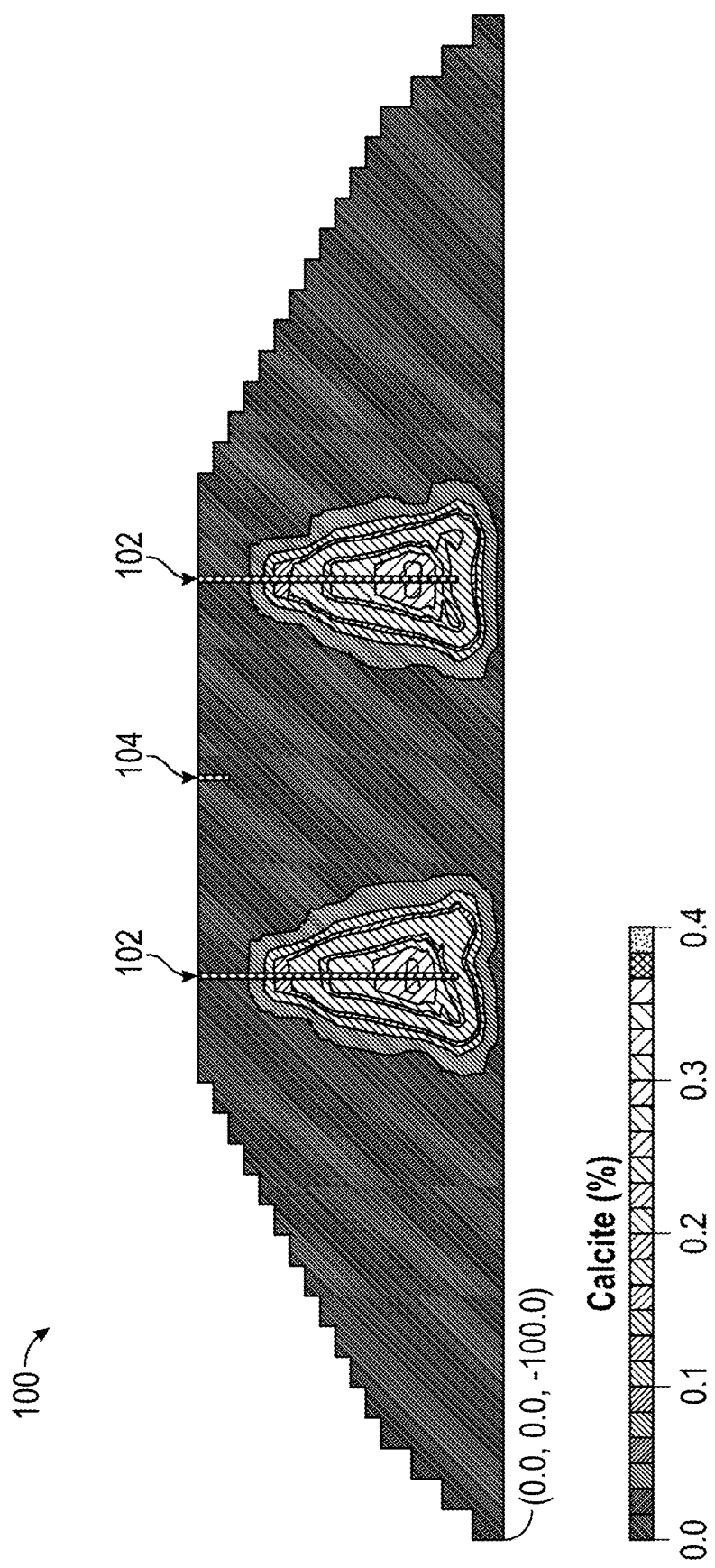
Figure 1C:
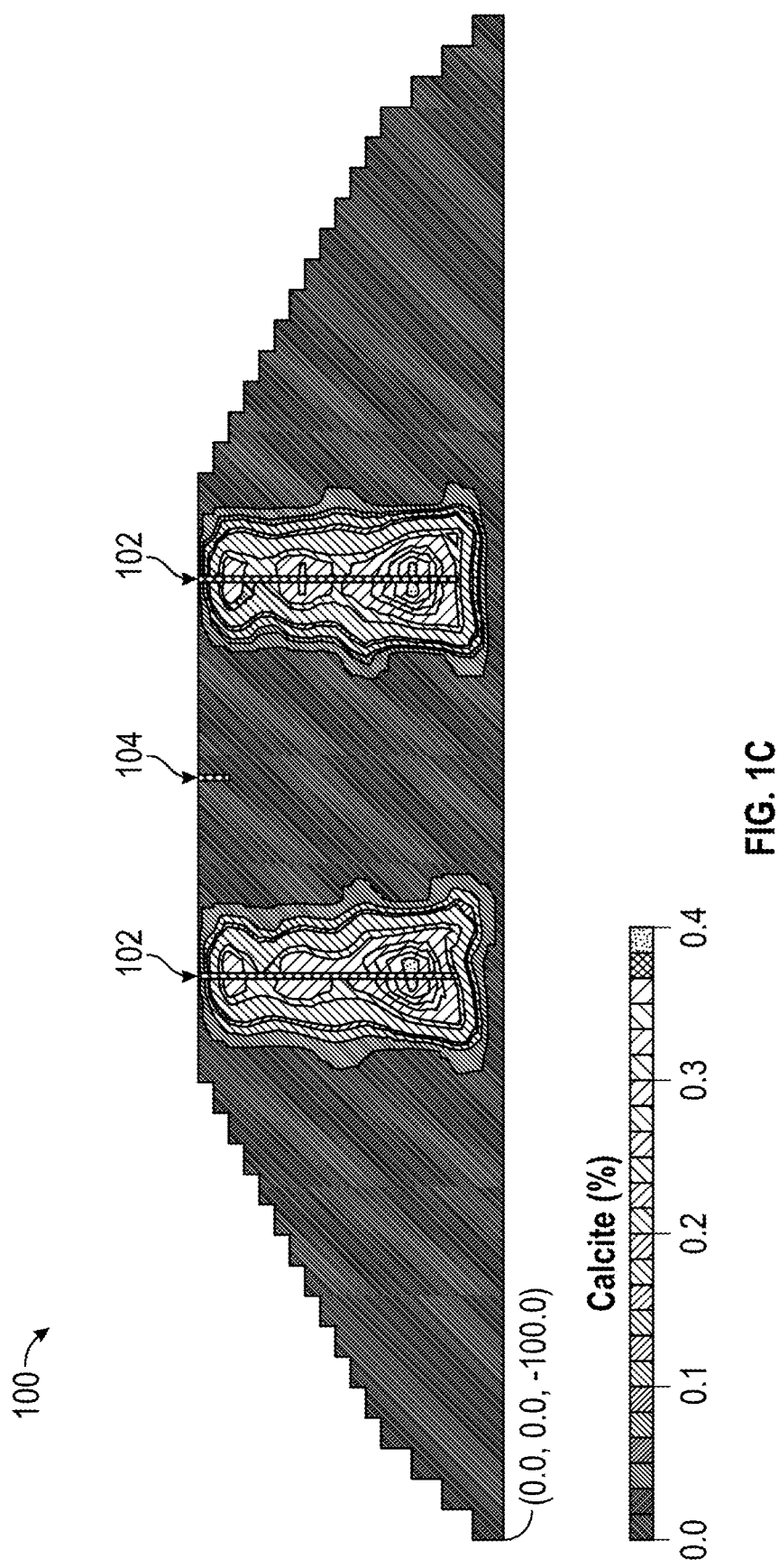
Figure 1D:
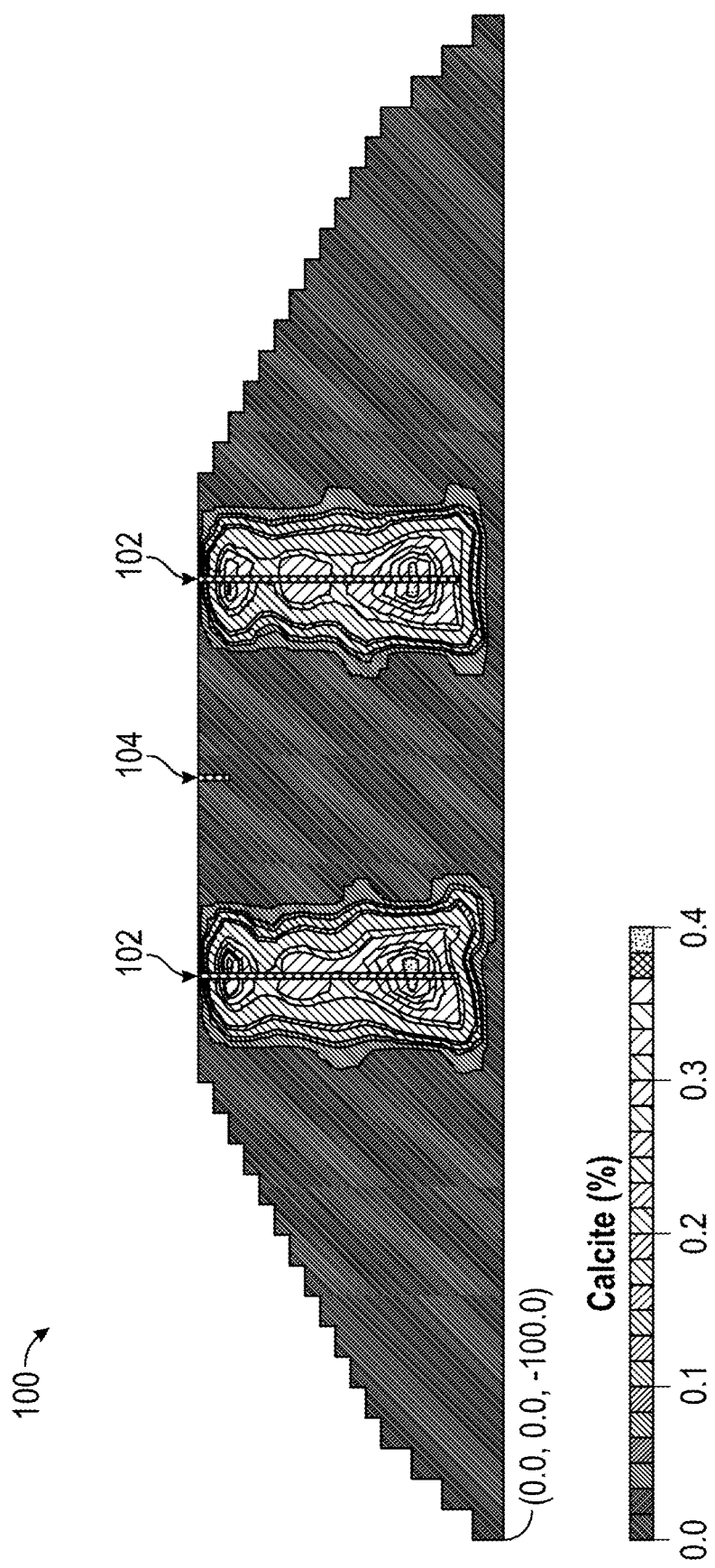
Figure 2A:
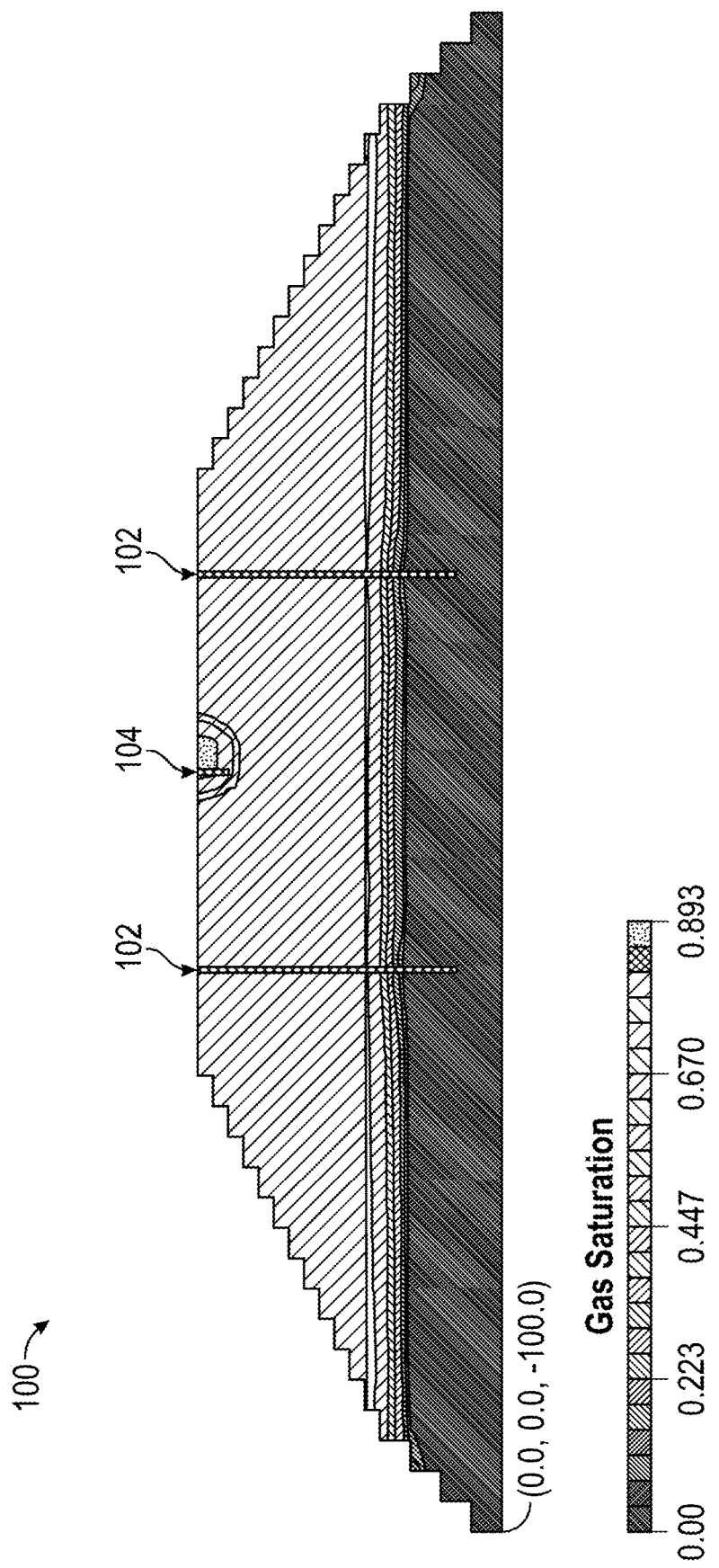
FIGS. 2A-2D are heat maps obtained by reactive transport modeling representing the gas saturation distribution of a subterranean formation at different time points post-natural gas production.
Figure 2B:
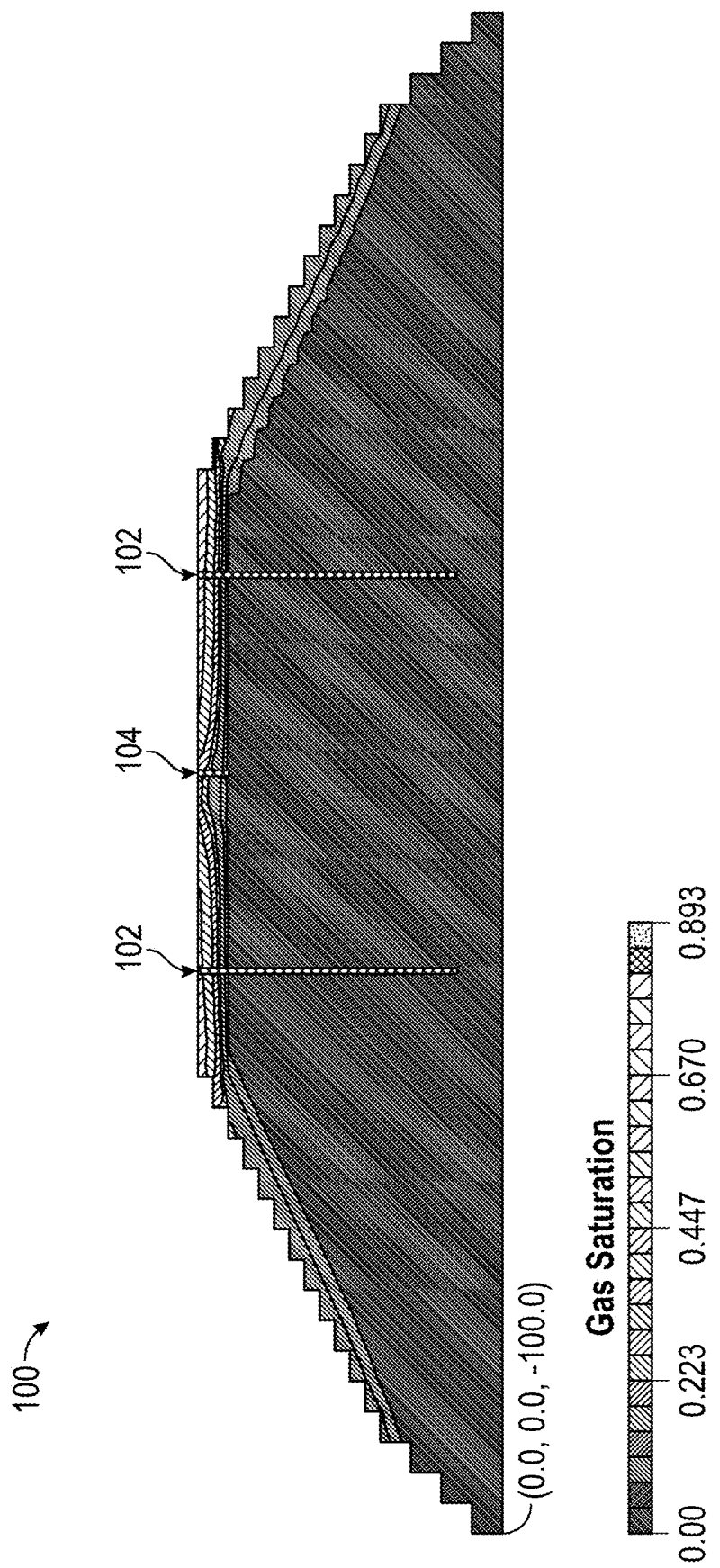
Figure 2C:
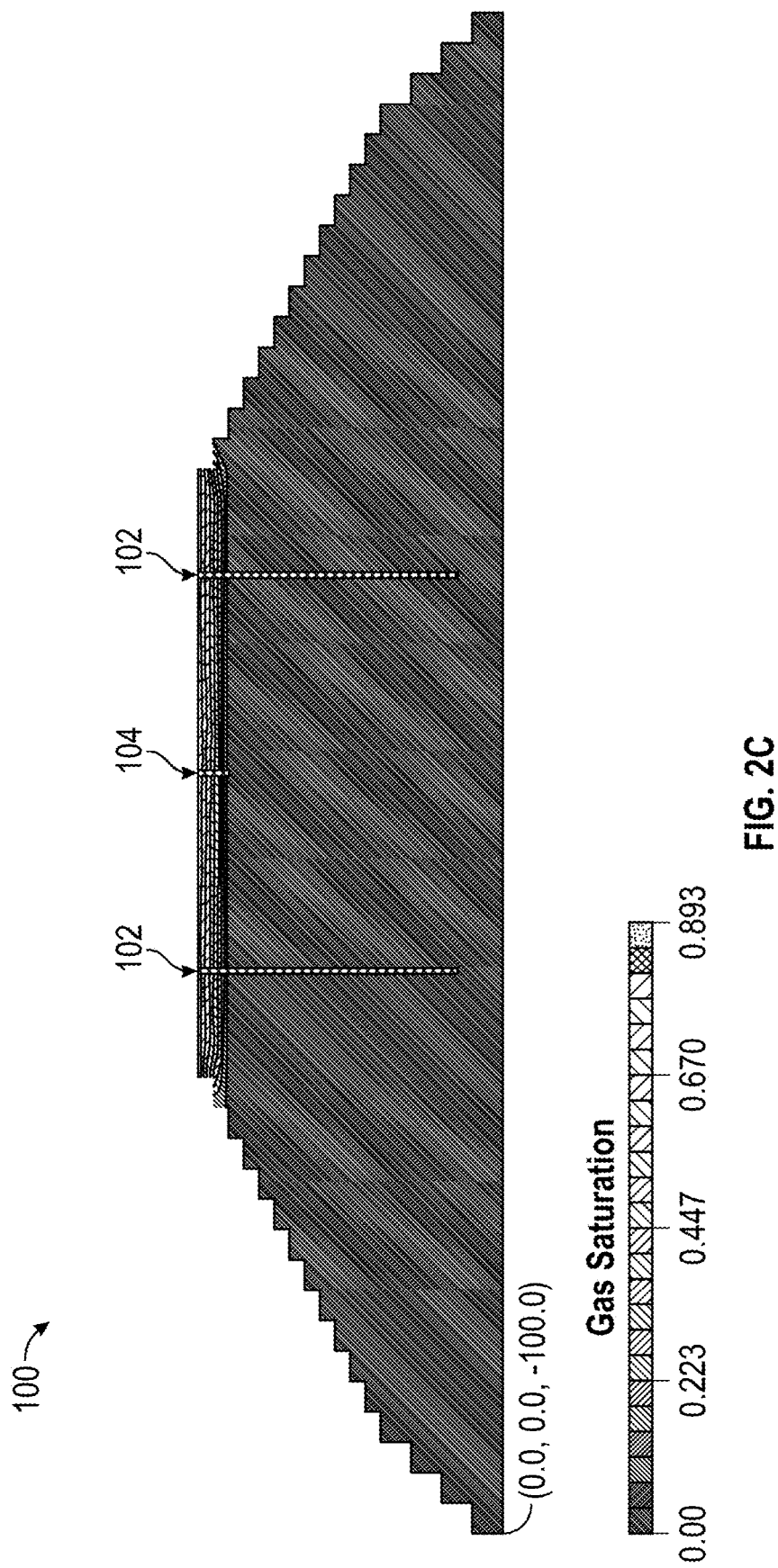
Figure 2D:
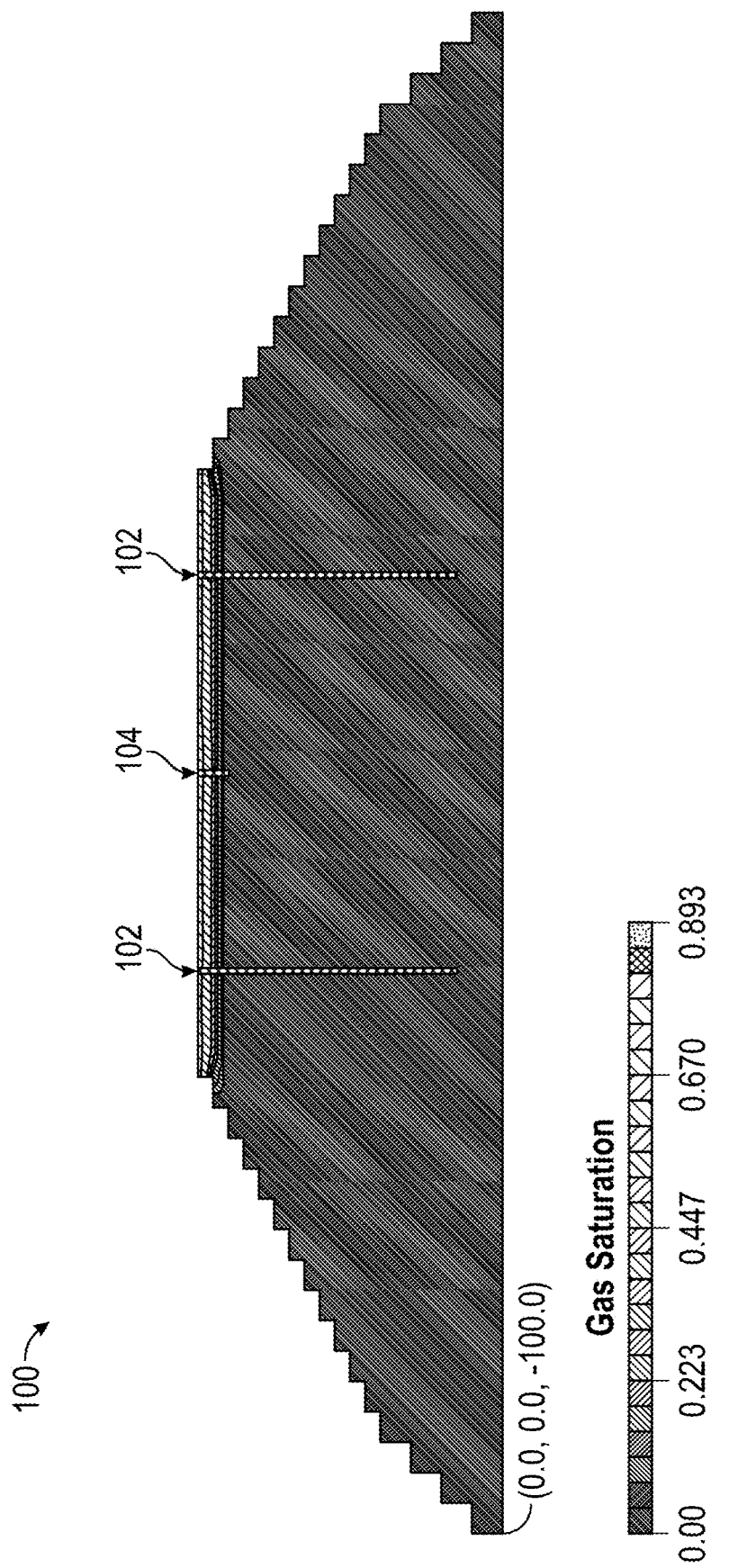
Figure 3A:
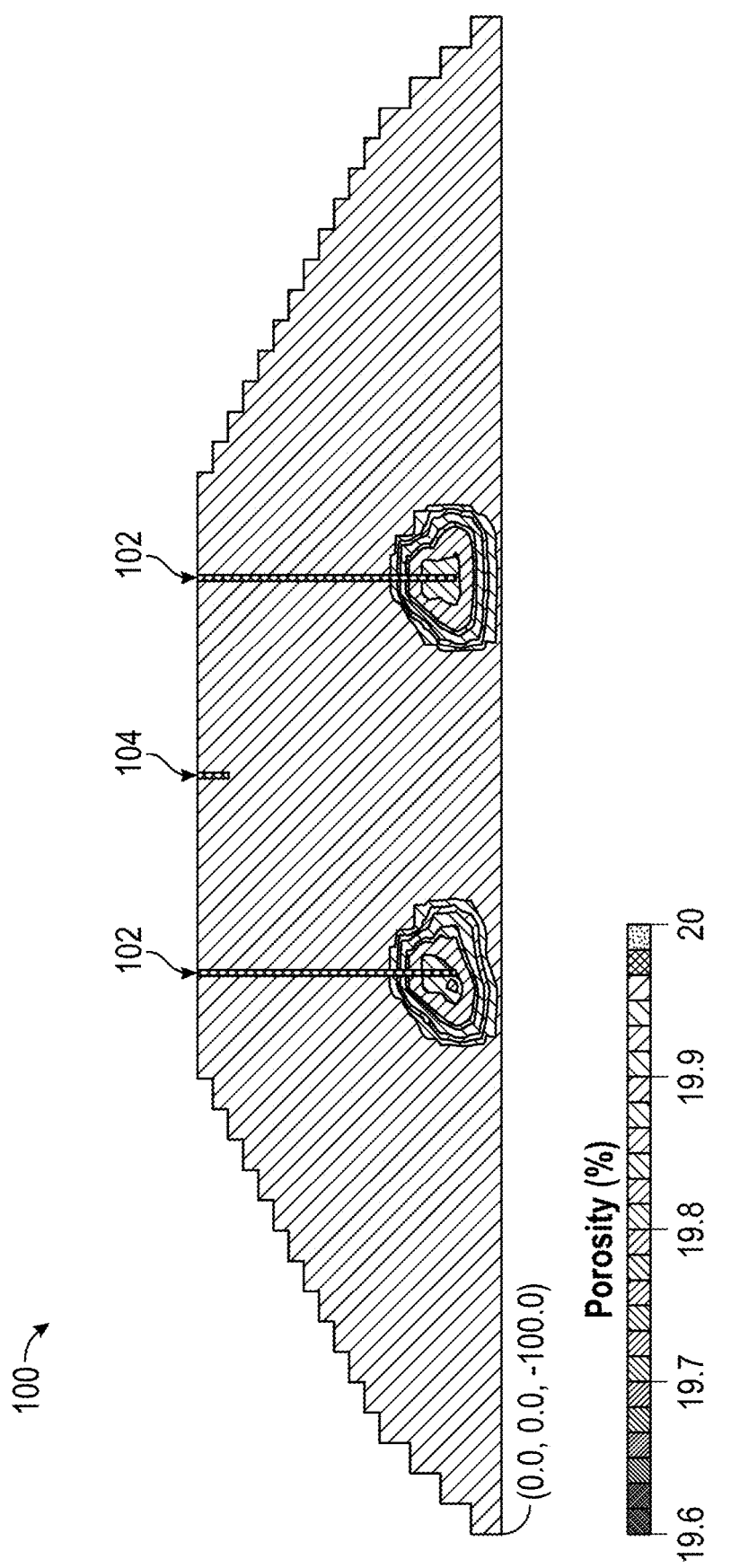
Figure 3B:
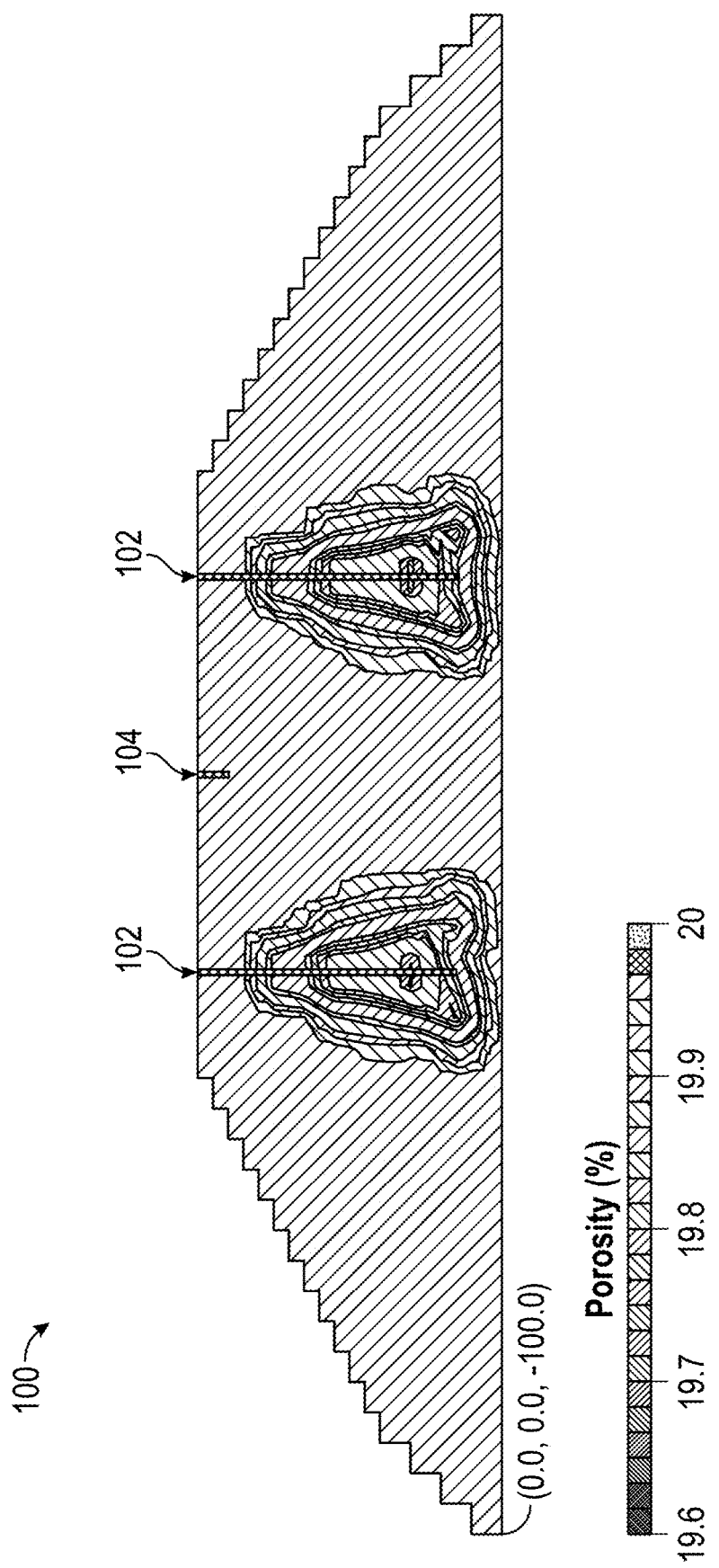
Figure 4A:
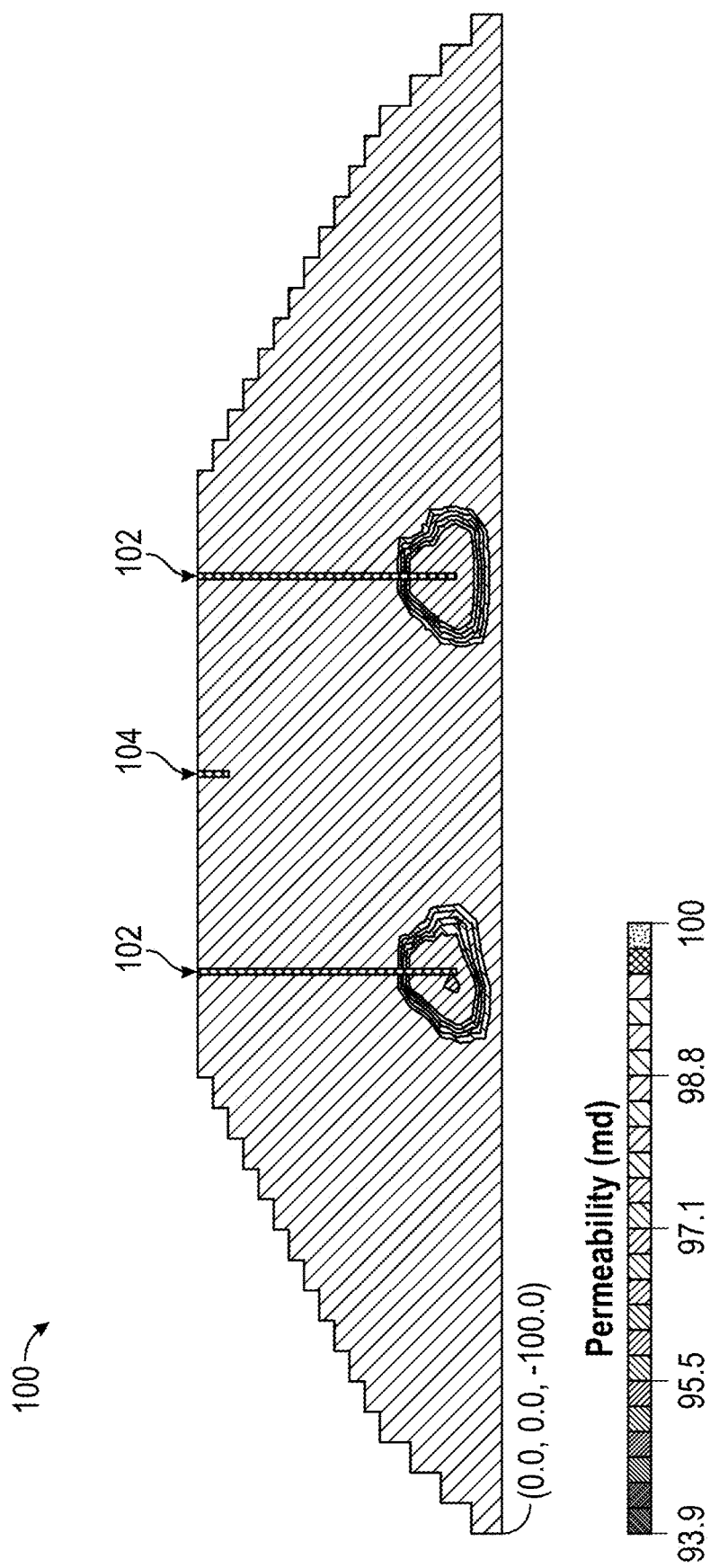
FIGS. 4A-4D are heat maps obtained by reactive transport modeling representing the permeability of a subterranean formation at different time points post-natural gas production.
Figure 4B:
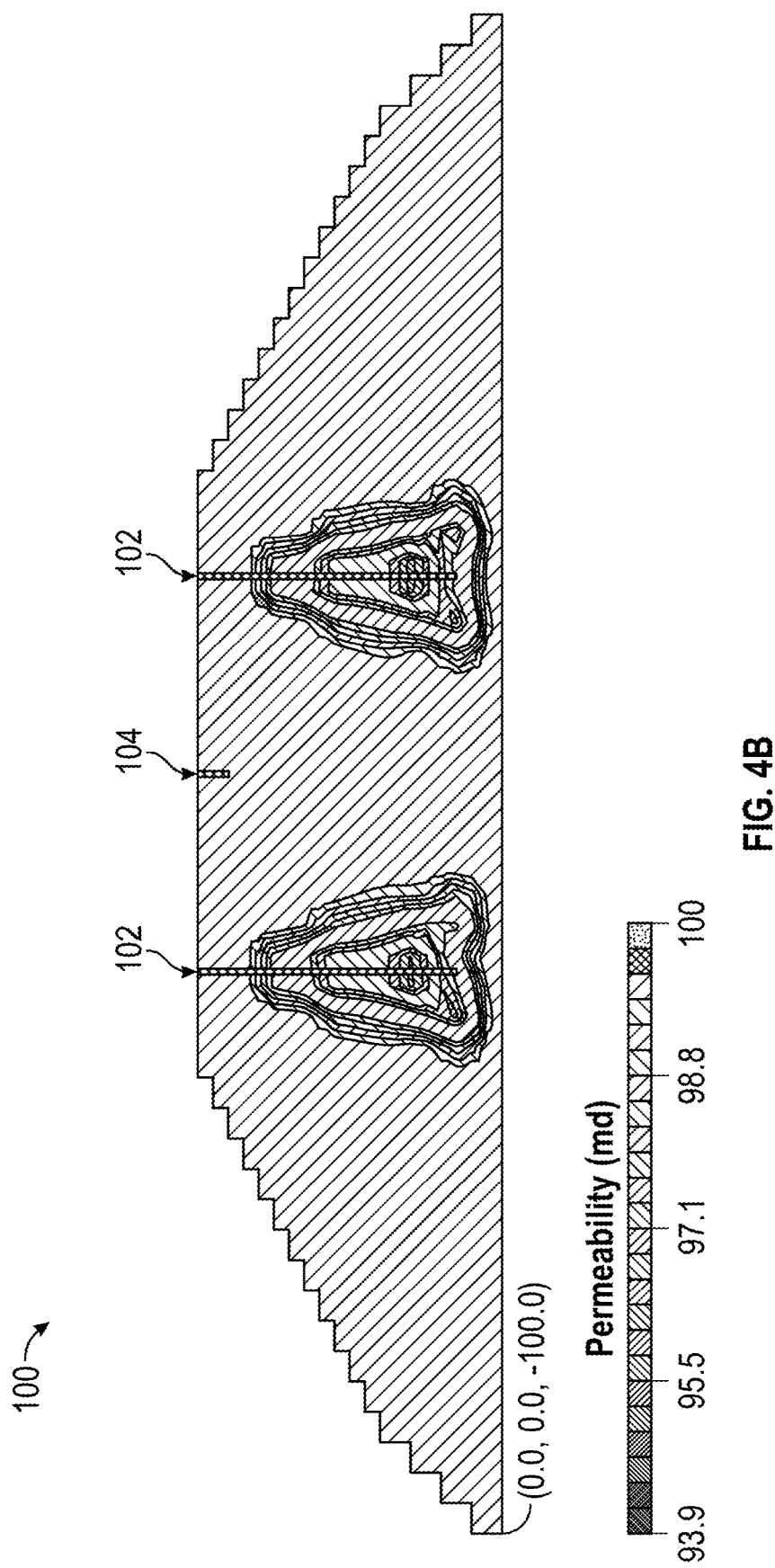
Figure 4C:
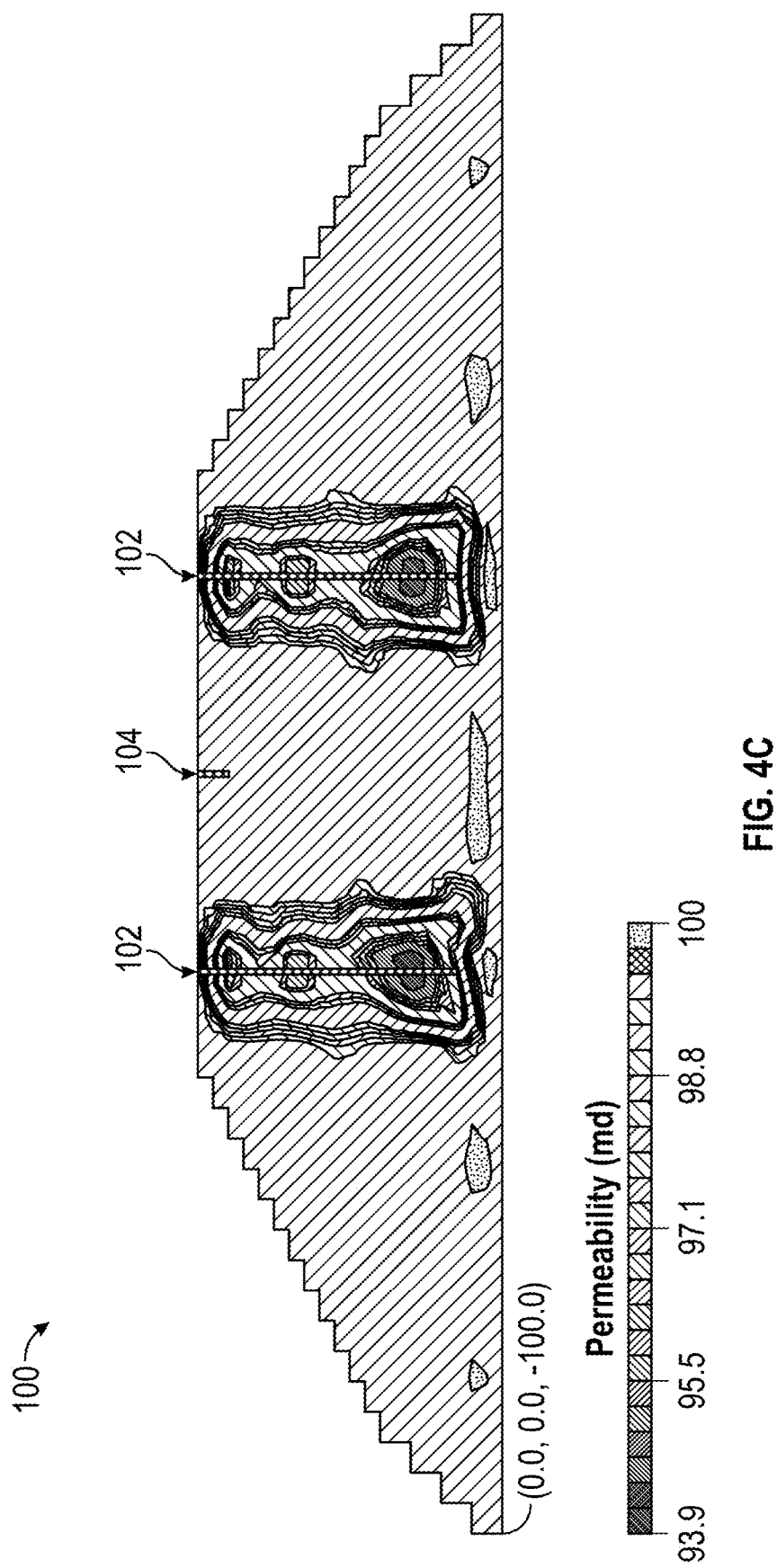
Figure 4D:
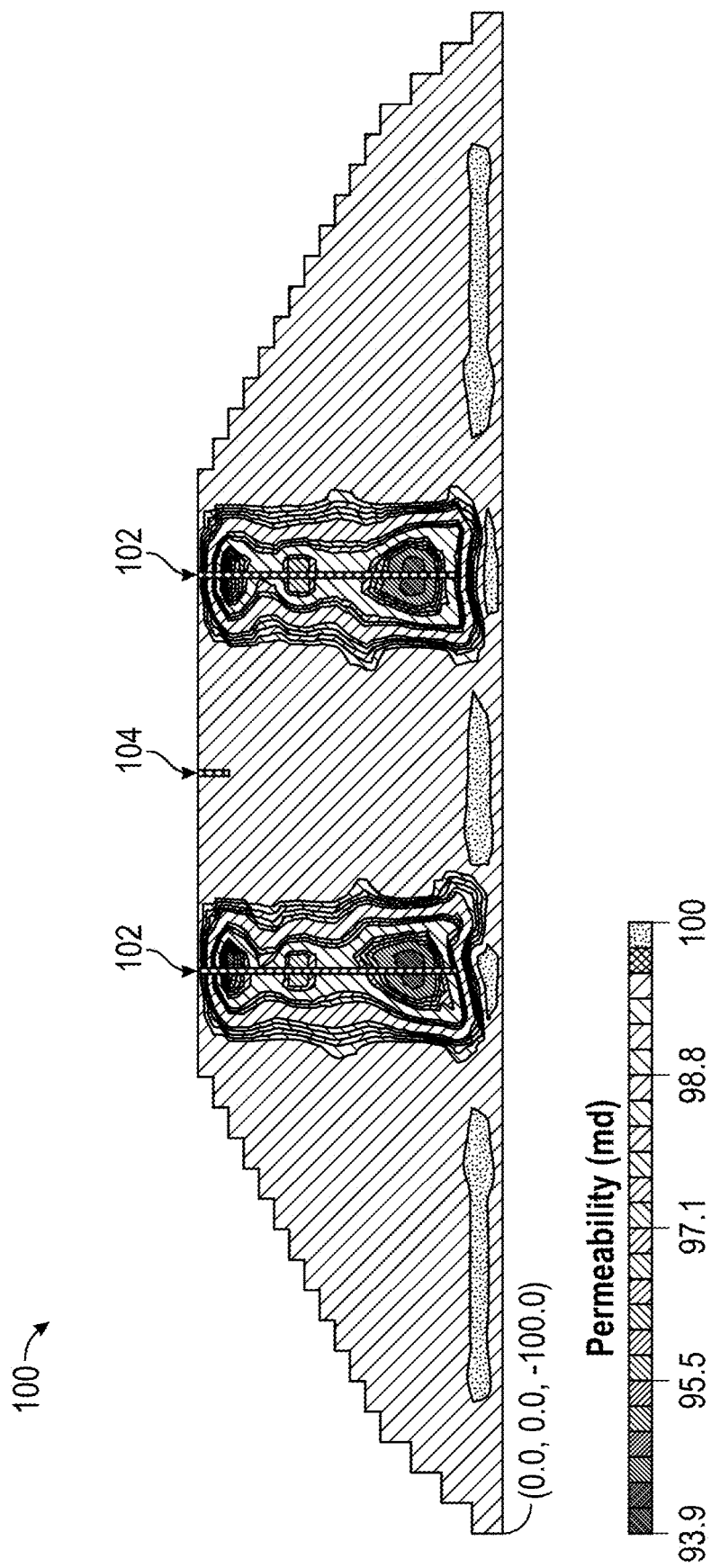
Figure 5A:
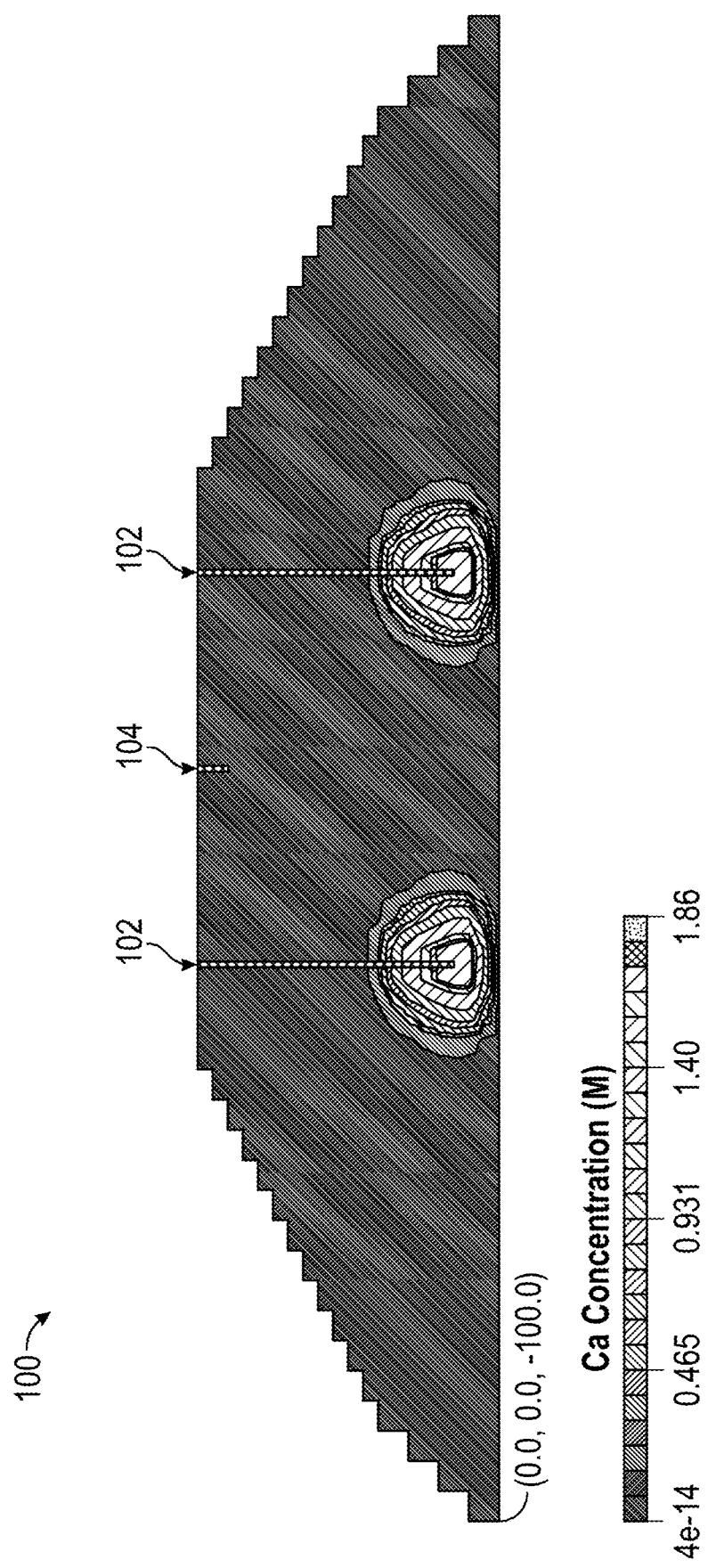
Figure 5C:
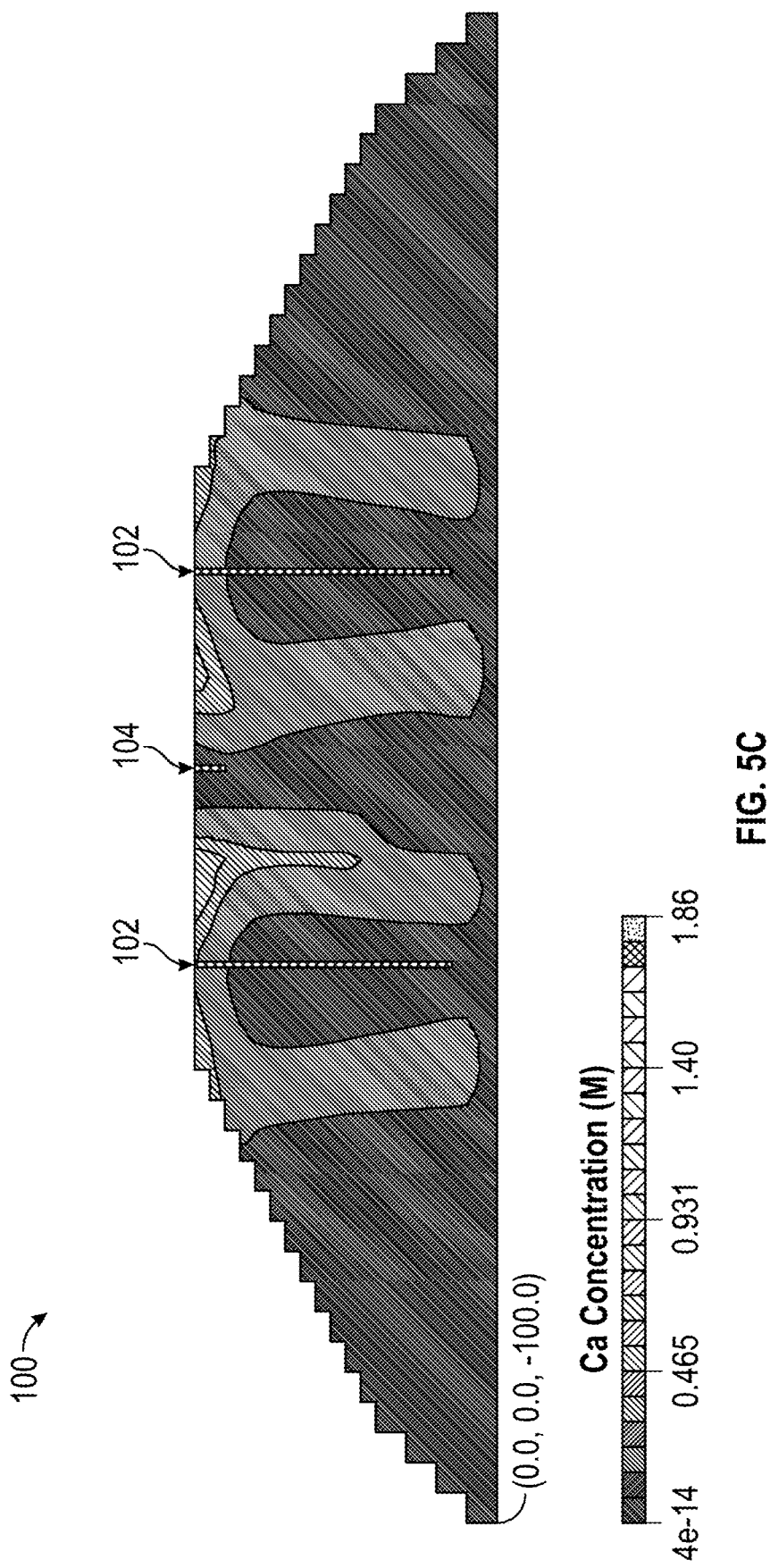
Figure 5D:
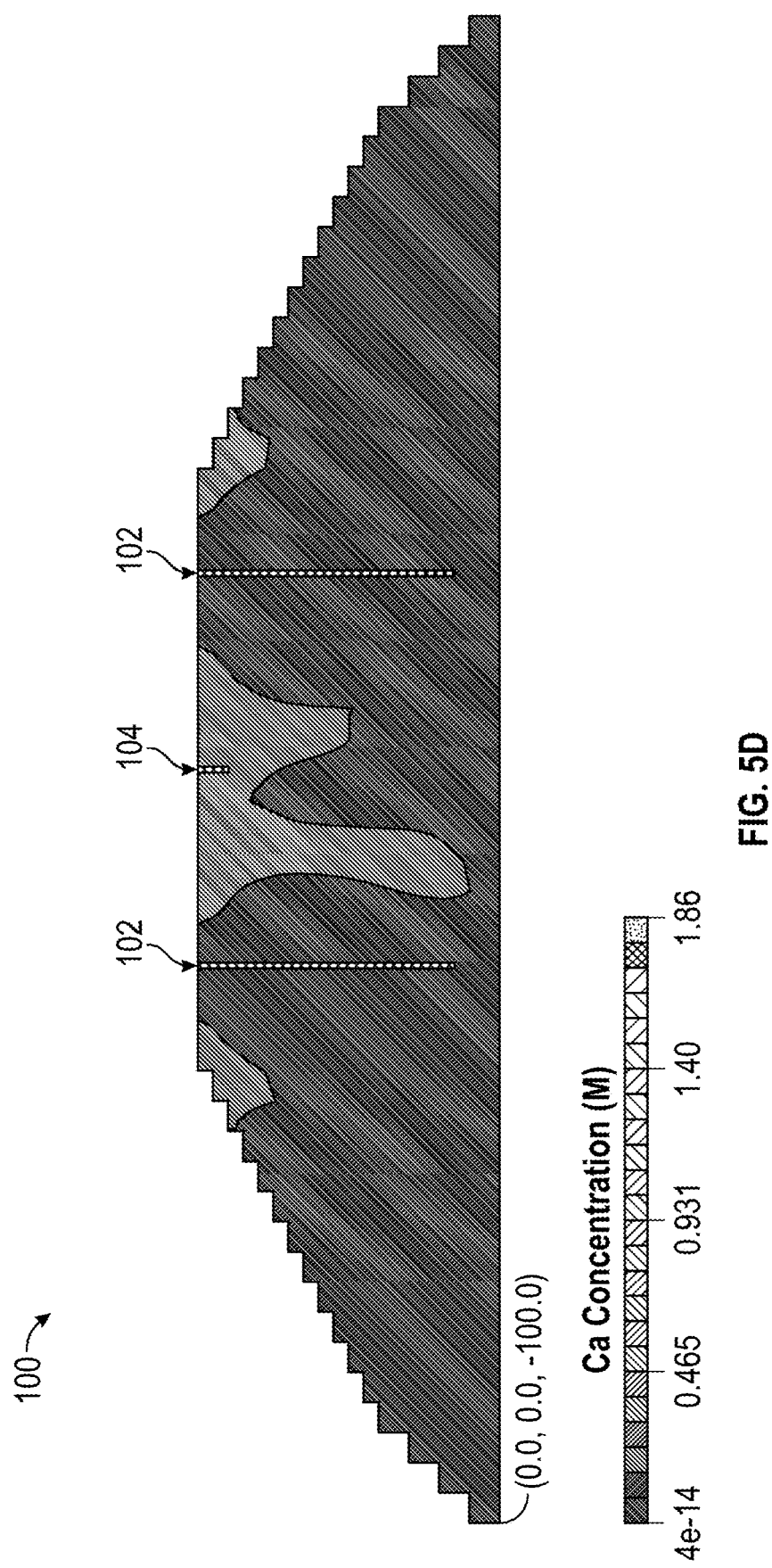
Figure 6A:
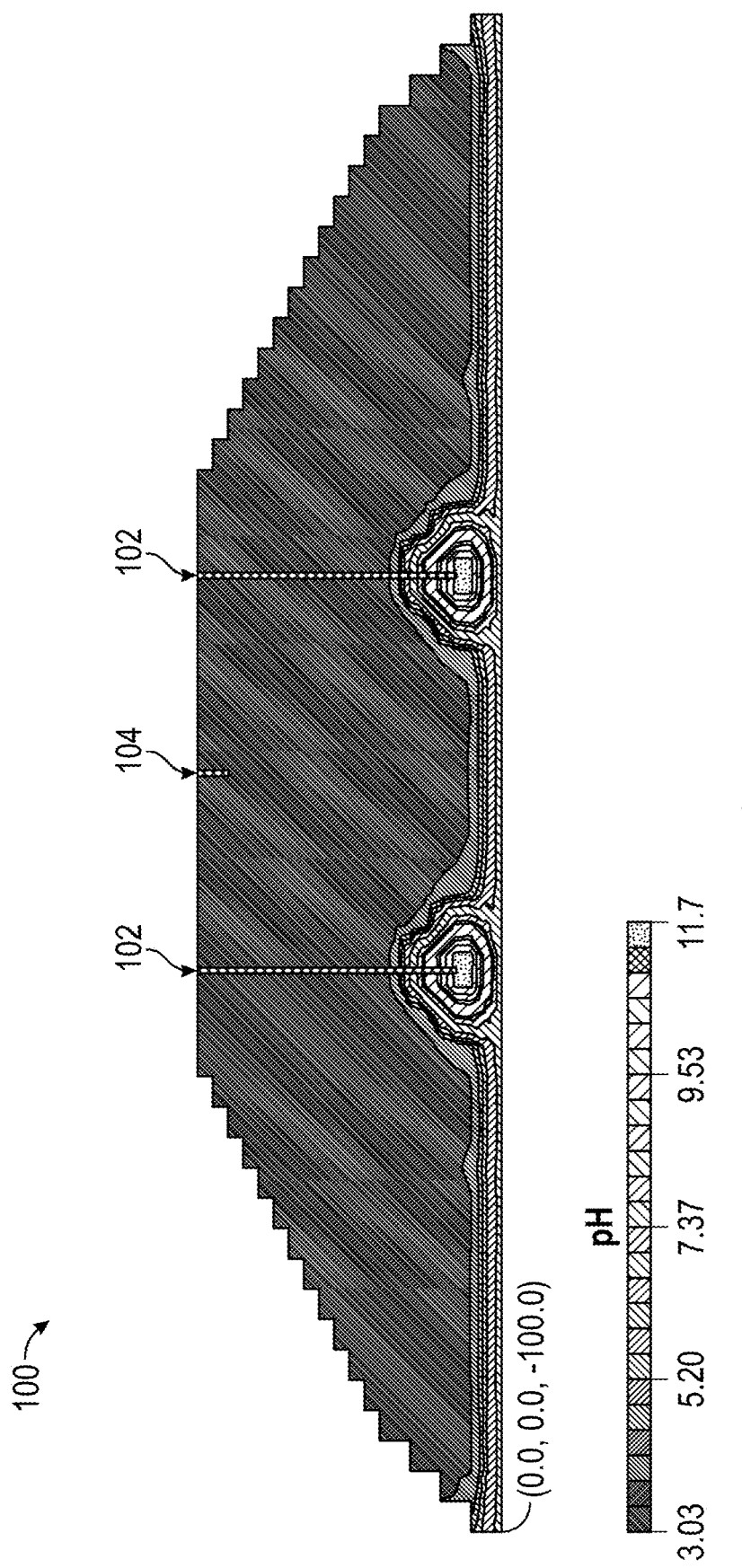
FIGS. 6A-6D are heat maps obtained by reactive transport modeling representing the pH distribution of a subterranean formation at different time points post-natural gas production.
Figure 6B:
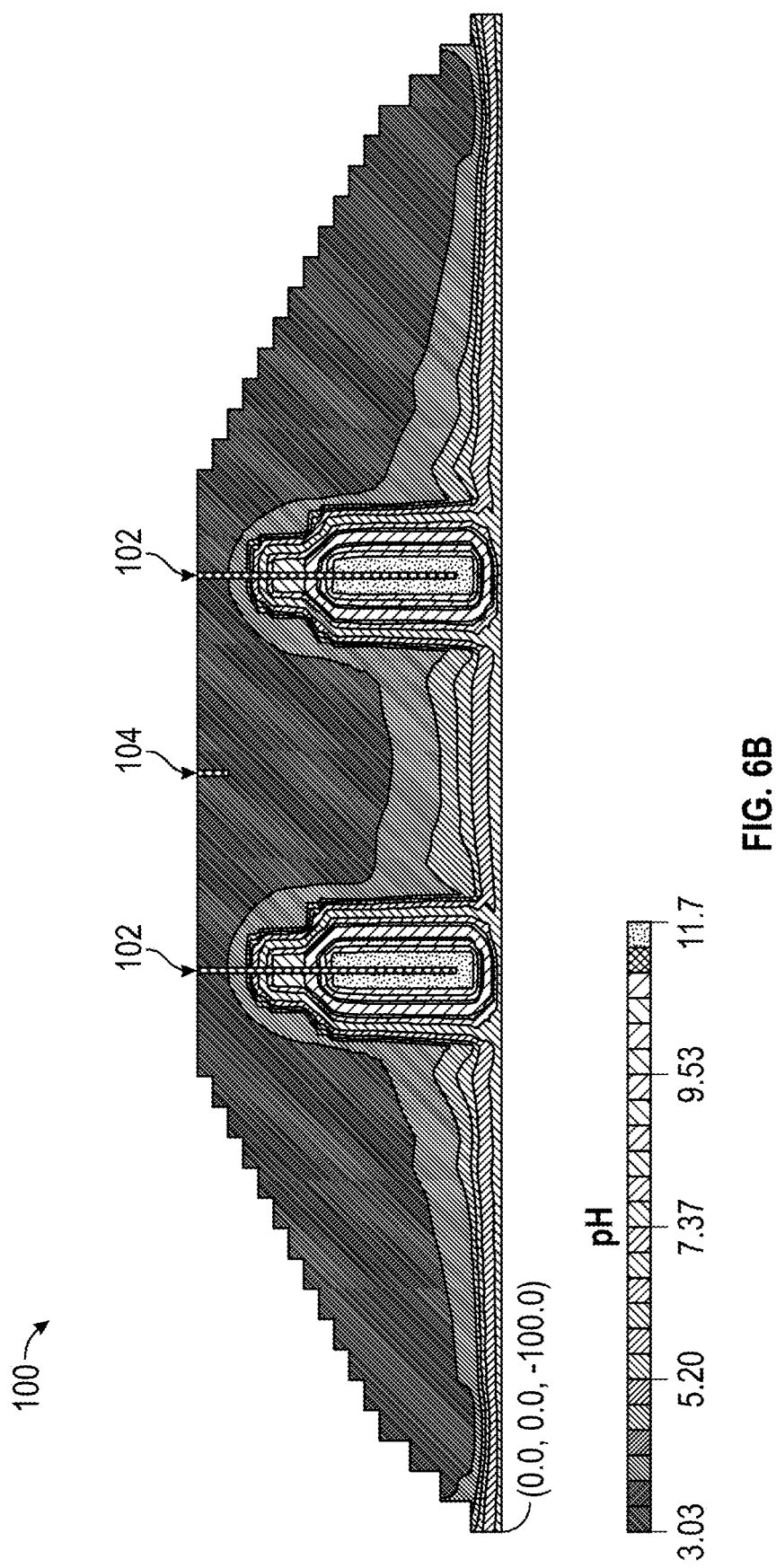
Figure 6C:
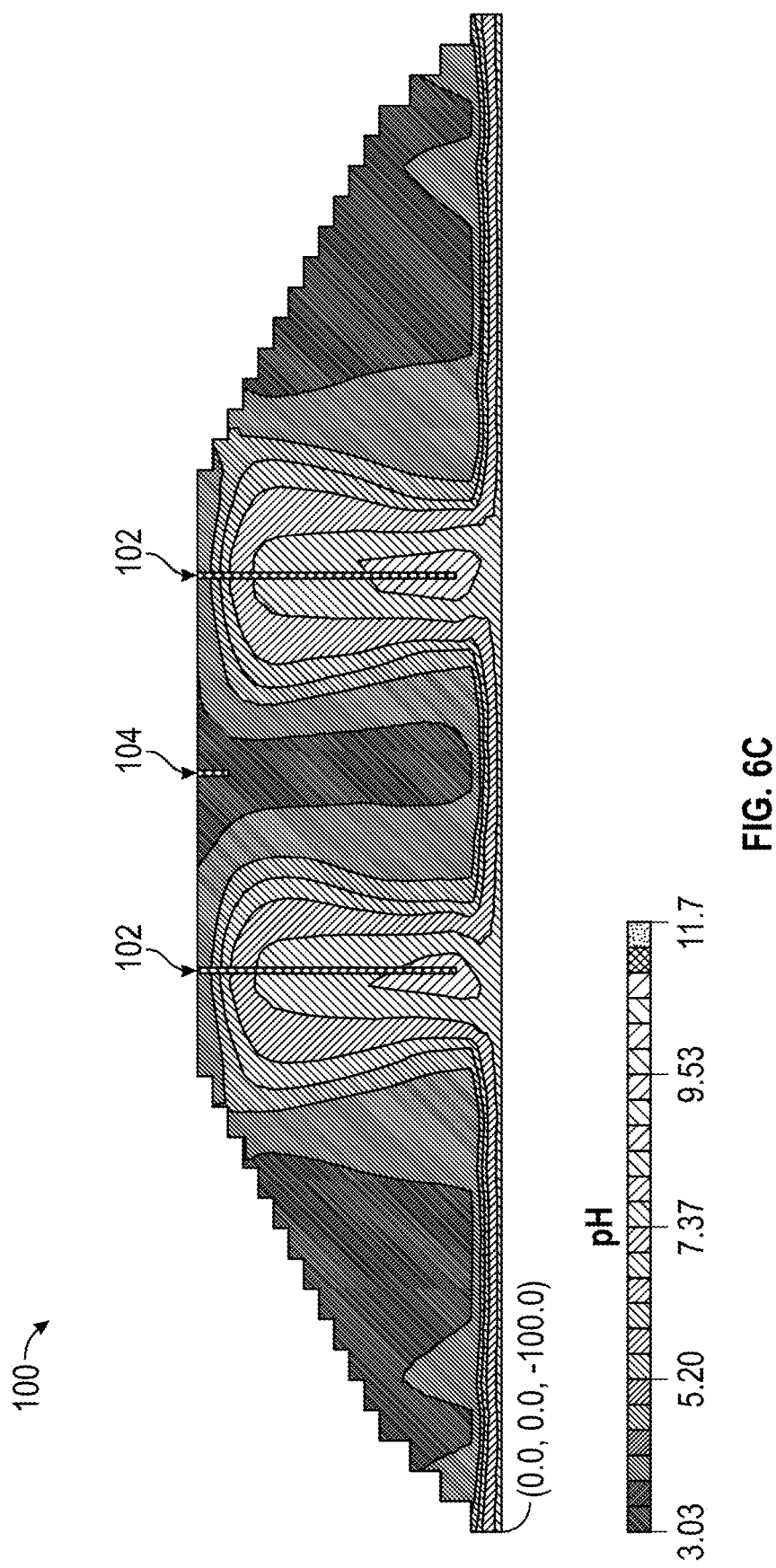
Figure 6D:
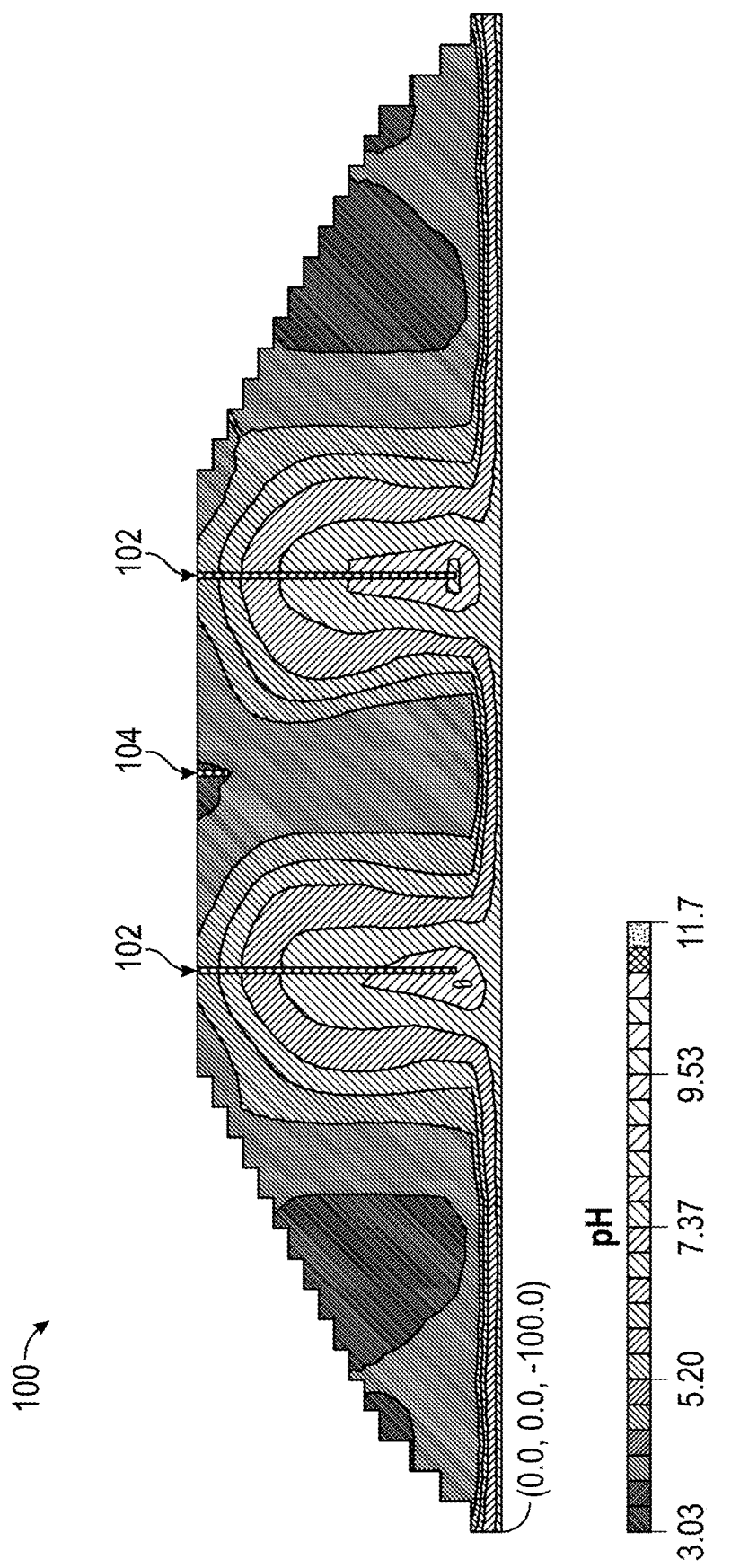

Embodiments in accordance with the present disclosure generally relate to reducing carbon dioxide production from gas wells and to carbon sequestration and, more particularly, to removing carbon dioxide from natural gas in situ.

The present disclosure addresses the removal of carbon dioxide from natural gas before production from the well. In particular, the present disclosure provides methods of carbon dioxide removal from natural gas that occur downhole. As mentioned previously, the presence of carbon dioxide in natural gas can lower the heat value of the natural gas and may contribute to climate change due to accidental release during extraction. Furthermore, it is advantageous to remove carbon dioxide from the natural gas in situ rather than having to remove produced carbon dioxide from natural gas.

The present disclosure achieves carbon dioxide removal via in situ reaction with calcium. Carbon dioxide, when reacted with calcium ions and water, forms an insoluble precipitate (calcite, $CaCO_3$), as shown below in Formula 1.

$$Ca^{2+}+CO_2(g)+H_2O \rightarrow CaCO_3+2H^+ \qquad \text{Formula 1}$$

However, this reaction occurs slowly under acidic conditions. As carbon dioxide reacts with calcium it forms calcite and free hydrogen atoms, which lower the pH as the reaction continues. As the pH lowers, the rate of the reaction is similarly reduced. Thus, to increase the efficiency of the reaction, an alkaline substance may be added to the reaction environment, such as slaked lime (calcium hydroxide), to keep the pH high enough to support continued formation of calcite.

Thus, methods for removing carbon dioxide from natural gas in situ are described herein. By introducing a basic aqueous fluid having a high concentration of calcium into a subterranean formation containing a natural gas and carbon dioxide, the carbon dioxide within the formation may be converted to calcite, lowering the concentration of the carbon dioxide.

In some preferred embodiments, the high-pH, calcium-rich treatment liquid introduced to the carbon-dioxide rich formation may be created from an origin fluid that is produced fluid naturally containing calcium in the desired concentration (about 1.5M or greater). In other embodiments, no suitably calcium-rich origin fluid may be available for the in situ treatment, in which case origin fluid is fortified with calcium ions, such fortification may be achieved through the addition of a calcium salt, such as calcium chloride and/or calcium nitrate, to the origin fluid. Of course, one of skill in the art will recognize that any suitable source of calcium ions may be used to raise the calcium concentration to the desired concentration.

In addition to achieving the desired calcium concentration, the pH of the treatment fluid should also be controlled to ensure that the formation pH does not rise to the level where the formation of calcite is inhibited. Preferably, the pH of the origin fluid is raised to about 11 or greater. While any alkaline substance may be used to achieve this goal, a preferable substance is calcium hydroxide, also known as slaked lime, $Ca(OH)_2$. Other alkaline substances suitable for use in the methods of the present disclosure include quicklime (calcium oxide), sodium hydroxide, potassium hydroxide, or any combination thereof. Generally, where calcium chloride and slaked lime are used, they are used at a $CaCl_2:Ca(OH)_2$ ratio of about 100:1. Once the origin fluid has the desired pH and calcium concentration it is now a suitable treatment fluid that may be introduced into a subterranean formation containing both natural gas and carbon dioxide to sequester the carbon within the subterranean formation. To achieve that goal, within the formation, the calcium in the treatment fluid reacts with the in situ carbon dioxide to form calcite, thereby reducing the concentration of carbon dioxide in the formation. After which the natural gas, having a lower concentration of entrained $CO_2$, may be produced from the formation.

Figure 7:
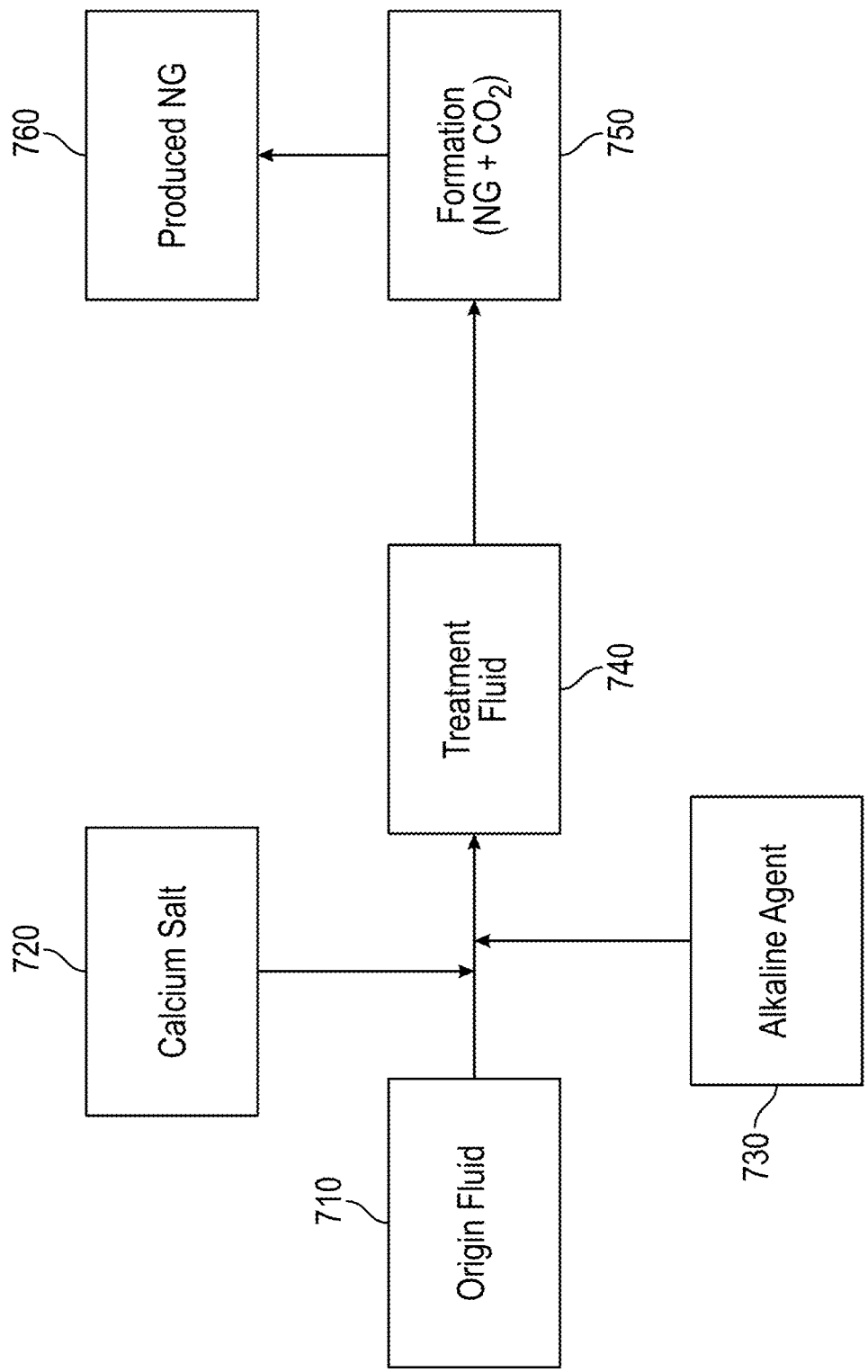
FIG. 7 is a block diagram of a scheme for preparing and using a treatment fluid of the present disclosure to capture carbon within a subterranean formation.

FIG. 7 shows the basic scheme of preparing and using the treatment fluid to capture carbon within the subterranean formation. Initially, an origin fluid 710 is provided, as described above, this may be a produced fluid having naturally high calcium levels, or any other available aqueous fluid. The origin fluid is then treated with an alkaline agent 730 (such as slaked lime) and, optionally, a calcium salt 720 (such as calcium chloride) to create treatment fluid 740. One of skill in the art will recognize that if the origin fluid 710 naturally contains a desired level of calcium ions, then addition of calcium salt 720 will not be needed. Thus, treatment fluid 740, having the desired level of calcium ions (1.5M or greater) and the desired pH (11 or greater) may be added to subterranean formation 750, wherein the formation 750 includes natural gas and carbon dioxide. The addition of treatment fluid 740 to formation 750 will cause calcite to precipitate within the formation, where it will remain, allowing natural gas within the formation, along with any remaining, entrained carbon dioxide, to be produced 760.

Moreover, modeling techniques may be used to determine and predict various conditions of the in situ reaction. One or more parameters of the methods of the present disclosure may be determined using reactive transport modeling (RTM). RTM is a tool that applies the kinetic theory to understand the dynamics of subsurface physical and chemical processes. RTM couples fluid flow and geochemical reactions to predict the spatial and temporal distributions of fluid and rock properties.

The subterranean formation of the present disclosure may be any such subterranean formation containing natural gas and carbon dioxide. As used herein, the term "natural gas" refers to a naturally occurring mixture of gaseous hydrocarbons consisting primarily of methane in addition to various smaller amounts of other higher alkanes. The gaseous composition within the subterranean formation may naturally have a high concentration of carbon dioxide. For example, the gaseous composition within the subterranean formation may have a concentration of carbon dioxide of about 3 vol % to about 25 vol %, or about 3 vol % to about 20 vol %, or about 1 vol % to about 15 vol %, or about 1 vol % to about 10 vol %, or about 3 vol % to about 5 vol %, or about 5 vol % to about 25 vol %, or about 5 vol % to about 20 vol %, or about 5 vol % to about 15 vol %, or about 5 vol % to about 10 vol %, or about 10 vol % to about 25 vol %, or about 10 vol % to about 20 vol %, or about 10 vol % to about 15 vol %, or about 15 vol % to about 25 vol %, or about 15 vol % to about 20 vol %, or about 20 vol % to about 25 vol %.

The temperature within the subterranean formation may, for example, be about 50° C. to about 100° C., or about 50° C. to about 90° C., or about 50° C. to about 80° C., or about 50° C. to about 70° C., or about 50° C. to about 60° C., or about 60° C. to about 100° C., or about 60° C. to about 90° C., or about 60° C. to about 80° C., or about 60° C. to about 70° C., or about 70° C. to about 100° C., or about 70° C. to about 90° C., or about 70° C. to about 80° C., or about 80° C. to about 100° C., or about 80° C. to about 90° C., or about 90° C. to about 100° C.

The pressure within the subterranean formation may, for example, be about 100 bar to about 300 bar, or about 100 bar to about 250 bar, or about 100 bar to about 200 bar, or about 100 bar to about 150 bar, or about 150 bar to about 300 bar, or about 150 bar to about 250 bar, or about 150 bar to about 200 bar, or about 200 bar to about 300 bar, or about 200 bar to about 250 bar, or about 250 bar to about 300 bar.

The origin fluid may be any water-based fluid suitable for the methods of the present disclosure. For example, the aqueous fluid may include, but is not limited to, brine, seawater, fresh water, groundwater, salt lake water, the like, and any combination thereof. Preferably, the aqueous fluid may be a produced water. As used herein, the term "produced water" refers to water that is produced as a byproduct during the extraction of oil and natural gas.

Furthermore, in preferred embodiments the origin fluid may naturally have a high concentration of calcium. The concentration in the origin fluid may, for example, be about 1.5 M or higher, or about 2 M or higher, or about 2.5 M or higher, or about 3 M or higher. In other embodiments, the origin fluid may not naturally have a high concentration of calcium, referred to herein as a "calcium-lean" origin fluid, and may have a concentration of calcium of less than about 1.5 M, or less than about 1 M, or less than about 0.5 M, or less than about 0.1 M. In the instance of obtaining a calcium-lean origin fluid, an amount of calcium chloride may be introduced to the calcium-lean origin fluid to obtain a treatment fluid having a calcium concentration of about 1.5 M or higher.

The origin fluid may further comprise components other than calcium. For example, the origin fluid may comprise components including, but not limited to, magnesium, sodium, potassium, bicarbonate, sulfate, strontium, the like, and any combination thereof.

The inherent pH of the origin fluid is generally roughly neutral, while acidic or slightly acidic aqueous fluids may be used, particularly if they are high in calcium ions, it will be recognized that such aqueous fluid will need additional alkaline agents to increase the pH of the treatment fluid to the desired level. In preferred embodiments, the treatment pH of the treatment fluid before treatment with an alkaline agent may be about 6 to about 8, or about 6 to about 7.5, or about 6 to about 7, or about 6 to about 6.5, or about 6.5 to about 8, or about 6.5 to about 7.5, or about 6.5 to about 7, or about 7 to about 8, or about 7 to about 7.5, or about 7.5 to about 8. To ensure that the reaction environment for the conversion of carbon dioxide to calcite (i.e., carbon dioxide removal) remains basic, a basic material (e.g., slaked lime) may be continuously introduced into the aqueous fluid. The introduction of the slaked lime may change a pH of the aqueous fluid to about 11 or greater, or about 12 or greater, or about 13 or greater.

When the alkaline agent is slaked lime, it may be added to the origin fluid to result in a concentration of slaked lime in the aqueous fluid of about 0.015 M or greater, or about 0.02 M or greater, or about 0.025 M or greater, or about 0.03 M or greater.

The aqueous fluid, having the desired level of calcium ions and the desired pH adjusted, may then be introduced into the subterranean formation, such as by injection, to both pressurize the subterranean formation for gas extraction and to remove carbon dioxide from the gas therein by conversion to calcite. That is, the treatment fluid may be used to simultaneously trap calcium within the formation while pressing natural gas from the formation. In such cases, the treatment fluid may be introduced into the subterranean formation via one or more injection wells penetrating the subterranean formation, where the natural gas exits the formation via a production well.

As noted above, the reaction of carbon dioxide into calcite by calcium and water may be a mineralization reaction, such as the reaction scheme given in Formula 1, in which calcite is $CaCO_3$.

$$Ca^{2+} + CO_2(g) + H_2O \rightarrow CaCO_3 + 2H^+ \quad \text{Formula 1}$$

At least a portion of the carbon dioxide in the gas within the subterranean formation may react with the calcium in the aqueous fluid to form calcite. Accordingly, the concentration of carbon dioxide in the gas may be lower after the formation of calcite. For example, following the conversion of carbon dioxide into calcite, the concentration of carbon dioxide in the gas produced from the formation may be less than about 3 vol %, or less than about 2 vol %, or less than about 1 vol %, or less than about 0.1 vol %.

After converting at least a portion of the carbon dioxide in the gas into calcite, the gas may be removed, or extracted, from the subterranean formation. The gas may be removed using one or more wells penetrating the subterranean formation that are separate from the wells used to introduce the treatment fluid into the subterranean formation. The pressure formed in the subterranean formation by the introduction of the aqueous fluid may drive the removal of the gas from the subterranean formation.

The produced gas may, for example, be removed from the subterranean formation at a rate of about 5 MMSCFD to about 15 MMSCFD, or about 1 MMSCFD to about 10 MMSCFD, or about 1 MMSCFD to about 5 MMSCFD, or about 5 MMSCFD to about 15 MMSCFD, or about 5 MMSCFD to about 10 MMSCFD, or about 10 MMSCFD to about 15 MMSCFD.

Introduction of the treatment fluid into and removal of the gas from the subterranean formation may be a continuous process occurring over several years. For example, aqueous fluid may be continuously introduced into the subterranean formation and the gas may be continuously removed from the subterranean formation over a period of about 1 year to about 50 years, or about 1 year to about 25 years, or about 1 year to about 10 years, or about 1 year to about 5 years, or about 5 years to about 50 years, or about 5 years to about 25 years, or about 5 years to about 10 years, or about 10 years to about 50 years, or about 10 years to about 25 years, or about 25 years to about 50 years.

One or more method parameters including, but not limited to, the (1) amount of calcium chloride introduced to the calcium-lean aqueous fluid that may be a first output of a reactive transport model, (2) the amount of slaked lime introduced to the aqueous fluid that may be a second output of a reactive transport model, (3) the rate of introduction of the aqueous fluid into the subterranean formation that may be a third output of a reactive transport model, the like, and any combination thereof may be determined using RTM. RTM may be used to optimize the geochemistry of the aqueous fluid and the procedure of introducing the aqueous fluid into the subterranean formation. A model may be developed to support the methods of the present disclosure. During the introduction of the aqueous fluid into the subterranean formation, the model may be calibrated with data obtained from chemical analyses of the gas removed from the subterranean formation. The model results may, for example, include the spatial and temporal distribution of the gas saturation, gas-water contact, the chemistry of the aqueous fluid, calcite precipitation, and porosity-permeability reduction.

EXAMPLES

A parametric case study of in situ carbon dioxide mineralization in a natural gas reservoir was conducted using RTM. The simulated natural gas reservoir produced dry natural gas consisting of 80 vol % methane and 20 vol % carbon dioxide. The reservoir temperature was set to 75° C. and the pressure was 200 bar. Natural gas was produced from the reservoir at a rate of 10 MMSCFD with a gas formation volume factor of 0.005 over a period of 50 years. Two injection wells for the treatment fluid were modeled in the reservoir and located on either side of the natural gas production well. The injection rate of the treatment fluid was set to 890 bbl/d. A titration-type batch model was used to model the conditions of the treatment fluid. Calcium chloride and slaked lime were added step-wise into the origin fluid, with the composition and pH of the treatment fluid recalculated at each step to maintain a calcium chloride concentration of 2 M, a slaked lime concentration of 0.02 M, and a pH of 11.6. Table 1 summarizes the simulated amount of carbon dioxide and methane in the gas removed from the reservoir over time and the respective amounts of calcite formed for the amount of calcium ions injected into the reservoir.

TABLE 1

| Years | $CO_2$ in produced gas (vol %) | $CH_4$ in produced gas (vol %) | Total gas produced ($m^3$) | Total calcite formed (kg) | $Ca^{2+}$ injected (kg) | $Ca^{2+}$ in reservoir (kg) |
| --- | --- | --- | --- | --- | --- | --- |
| 0 | 20 | 80 | 0 | 0 | 0 | 0 |
| 10 | 19.9 | 80.1 | $1.03 \times 10^9$ | $7.54 \times 10^7$ | $9.09 \times 10^7$ | $6.07 \times 10^7$ |
| 20 | 19.7 | 80.3 | $2.07 \times 10^9$ | $1.62 \times 10^8$ | $1.82 \times 10^8$ | $1.17 \times 10^8$ |
| 30 | 19.4 | 80.6 | $3.10 \times 10^9$ | $2.64 \times 10^8$ | $2.73 \times 10^8$ | $1.67 \times 10^8$ |
| 40 | 18.8 | 81.2 | $4.13 \times 10^9$ | $3.98 \times 10^8$ | $3.63 \times 10^8$ | $2.04 \times 10^8$ |
| 50 | 16.9 | 83.1 | $5.16 \times 10^9$ | $5.68 \times 10^8$ | $4.54 \times 10^8$ | $2.27 \times 10^8$ |
| 200 | 6.3 | 93.8 | $5.16 \times 10^9$ | $8.49 \times 10^8$ | $4.54 \times 10^8$ | $1.15 \times 10^8$ |
| 1000 | 1.7 | 98.3 | $5.16 \times 10^9$ | $1.12 \times 10^9$ | $4.54 \times 10^8$ | $6.50 \times 10^6$ |

The results in Table 1 show that the concentration of carbon dioxide in the gas produced from the reservoir decreased from 20 vol % to approximately 16.9 vol % after 50 years. The carbon dioxide mineralization reactions continued after injection of the aqueous fluid were stopped after 50 years. Accordingly, the concentration of carbon dioxide in the produced gas continued to decrease to 6.3 vol % after 200 years and to under 2 vol % after 1000 years.

FIGS. 1A-1D are heat maps obtained by RTM representing the calcite distribution of the simulated subterranean formation 100 at different time points post-natural gas production. FIGS. 1A-1D show the calcite distribution at 10 years, 50 years, 200 years, and 1,000 years post-production, respectively. The heat maps confirm an increase in calcite concentration at the injection wells 102 over time, with no observable change in the calcite distribution at the production well 104.

FIGS. 2A-2D are heat maps obtained by RTM representing the gas saturation distribution of the simulated subterranean formation 100 at different time points post-natural gas production. FIGS. 2A-2D show the gas saturation distribution at 10 years, 50 years, 200 years, and 1,000 years post-production, respectively. The heat maps show a decrease in gas saturation distribution throughout the subterranean formation over time, with no observable change in the gas saturation distribution at the injection wells 102 and production well 104 after 50 years.

FIGS. 3A-3D are heat maps obtained by RTM representing the porosity of the simulated subterranean formation 100 at different time points post-natural gas production. FIGS. 3A-3D show the porosity at 10 years, 50 years, 200 years, and 1,000 years post-production, respectively. The heat maps show a decrease in porosity at the injection wells 102 over time, likely due to the increase in solid calcite concentration, with no observable difference in porosity at the production well 104.

FIGS. 4A-4D are heat maps obtained by RTM representing the permeability of the simulated subterranean formation 100 at different time points post-natural gas production. FIGS. 4A-4D show the permeability at 10 years, 50 years, 200 years, and 1,000 years post-production, respectively. Similarly to porosity, a decrease in permeability is observed at the injection wells 102 over time, with no observable difference in porosity at the production well 104.

FIGS. 5A-5D are heat maps obtained by RTM representing the calcium concentration distribution of the simulated subterranean formation 100 at different time points post-natural gas production. FIGS. 5A-5D show the calcium concentration distribution at 10 years, 50 years, 200 years, and 1,000 years post-production, respectively. The heat maps show an increase in calcium throughout the injection wells 102 at 10 years and 50 years post-production. However, a significant decrease in calcium is observed after 200 years and 1,000 years.

FIGS. 6A-6D are heat maps obtained by RTM representing the pH distribution of the simulated subterranean formation 100 at different time points post-natural gas production. FIGS. 6A-6D show the pH distribution at 10 years, 50 years, 200 years, and 1,000 years post-production, respectively. The heat maps show an increase in pH throughout the injection wells 102 at 10 years and 50 years post-production. However, a significant decrease in pH is observed after 200 years and 1,000 years.

Embodiments disclosed herein include:

A. A method comprising obtaining an origin fluid having a calcium concentration of about 1.5 M or greater; creating treatment fluid by introducing an amount of slaked lime to the origin fluid to change a pH of the resulting treatment fluid to about 11 or greater; wherein the amount of slaked lime is a second output of a reactive transport model; introducing the treatment fluid into a subterranean formation containing a formation gas comprising natural gas and carbon dioxide; wherein a rate of introduction of the treatment fluid into the subterranean formation is a third output of the reactive transport model; allowing the calcium in the treatment fluid to react with the carbon dioxide within the subterranean formation to form calcite; and removing the treated formation gas from the subterranean formation after the formation of calcite, wherein the concentration of carbon dioxide in the treated formation gas is lower than the formation gas before it was contacted with the treatment fluid.

B. A method comprising obtaining a calcium-lean aqueous fluid having a calcium concentration of less than about 1.5 M; continuously introducing an amount of calcium chloride to the calcium-lean aqueous fluid to obtain an aqueous fluid having a calcium concentration of about 1.5 M or greater; wherein the amount of calcium chloride is a first output of a reactive transport model; continuously introducing an amount of slaked lime to the aqueous fluid to change a pH of the aqueous fluid to about 11 or greater; wherein the amount of slaked lime is a second output of the reactive transport model; after changing the pH of the aqueous fluid, continuously introducing the aqueous fluid into a subterranean formation containing a gas comprising natural gas and carbon dioxide; wherein a rate of introduction of the aqueous fluid into the subterranean formation is a third output of the reactive transport model; allowing the calcium in the aqueous fluid to react with the carbon dioxide to form calcite; wherein a concentration of carbon dioxide in the gas is lower after the formation of calcite; and removing the gas from the subterranean formation after the formation of calcite.

Each of embodiments A and B may have one or more of the following additional elements in any combination: Element 1: wherein the aqueous fluid is a produced water. Element 2: wherein the concentration of carbon dioxide in the gas before the formation of calcite is about 3 vol % to about 25 vol %. Element 3: wherein the concentration of carbon dioxide in the gas after the formation of calcite is less than about 3 vol %. Element 4: wherein the pH of the aqueous fluid before introducing the amount of slaked lime is about 6 to about 8. Element 5: wherein a concentration of slaked lime in the aqueous fluid is about 0.015 M or greater. Element 6: wherein the aqueous fluid further comprises magnesium, sodium, potassium, chloride, bicarbonate, sulfate, strontium, or any combination thereof. Element 7: wherein the gas is removed from the subterranean formation at a rate of about 5 MMSCFD to about 15 MMSCFD. Element 8: wherein a temperature inside the subterranean formation is about 50° C. to about 100° C. Element 9: wherein a pressure inside the subterranean formation is about 100 bar to about 300 bar.

By way of non-limiting example, exemplary combinations applicable to A and B include: Element 1 with Element 2; Element 1 with Element 3; Element 1 with Element 4; Element 1 with Element 5; Element 1 with Element 6; Element 1 with Element 7; Element 1 with Element 8; Element 1 with Element 9; Element 1 with Element 2 and Element 3; Element 1 with Element 2, Element 3, and Element 4; Element 1 with Element 2, Element 3, Element 4, and Element 5; Element 1 with Element 2, Element 3, Element 4, Element 5, and Element 6; Element 1 with Element 2, Element 3, Element 4, Element 5, Element 6, and Element 7; Element 1 with Element 2, Element 3, Element 4, Element 5, Element 6, Element 7, and Element 8; Element 1 with Element 2, Element 3, Element 4, Element 5, Element 6, Element 7, Element 8, and Element 9.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, components, and/or groups, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
    obtaining an origin fluid having a calcium concentration of about 1.5 M or greater;

creating a treatment fluid by introducing an amount of slaked lime to the origin fluid to change a pH of the resulting treatment fluid to about 11 or greater;
  wherein the amount of slaked lime is a second output of a reactive transport model;
introducing the treatment fluid into a subterranean formation containing a formation gas comprising natural gas and carbon dioxide;
  wherein a rate of introduction of the treatment fluid into the subterranean formation is a third output of the reactive transport model;
allowing the calcium in the treatment fluid to react with the carbon dioxide within the subterranean formation to form calcite; and
  removing the treated formation gas from the subterranean formation after the formation of calcite, wherein the concentration of carbon dioxide in the treated formation gas is lower than the formation gas before it was contacted with the treatment fluid.

2. The method of claim 1, wherein the aqueous fluid is a produced water.

3. The method of claim 1, wherein the concentration of carbon dioxide in the gas before the formation of calcite is about 3 vol % to about 25 vol %.

4. The method of claim 1, wherein the concentration of carbon dioxide in the gas after the formation of calcite is less than about 3 vol %.

5. The method of claim 1, wherein the pH of the aqueous fluid before introducing the amount of slaked lime is about 6 to about 8.

6. The method of claim 1, wherein a concentration of slaked lime in the aqueous fluid is about 0.015 M or greater.

7. The method of claim 1, wherein the aqueous fluid further comprises magnesium, sodium, potassium, chloride, bicarbonate, sulfate, strontium, or any combination thereof.

8. The method of claim 1, wherein the gas is removed from the subterranean formation at a rate of about 5 MMSCFD to about 15 MMSCFD.

9. The method of claim 1, wherein a temperature inside the subterranean formation is about 50° C. to about 100° C.

10. The method of claim 1, wherein a pressure inside the subterranean formation is about 100 bar to about 300 bar.

11. A method comprising:
  obtaining a calcium-lean aqueous fluid having a calcium concentration of less than about 1.5 M;
  continuously introducing an amount of calcium chloride to the calcium-lean aqueous fluid to obtain an aqueous fluid having a calcium concentration of about 1.5 M or greater;
    wherein the amount of calcium chloride is a first output of a reactive transport model;
  continuously introducing an amount of slaked lime to the aqueous fluid to change a pH of the aqueous fluid to about 11 or greater;
    wherein the amount of slaked lime is a second output of the reactive transport model;
  after changing the pH of the aqueous fluid, continuously introducing the aqueous fluid into a subterranean formation containing a gas comprising natural gas and carbon dioxide;
    wherein a rate of introduction of the aqueous fluid into the subterranean formation is a third output of the reactive transport model;
  allowing the calcium in the aqueous fluid to react with the carbon dioxide to form calcite;
    wherein a concentration of carbon dioxide in the gas is lower after the formation of calcite; and
  removing the gas from the subterranean formation after the formation of calcite.

12. The method of claim 11, wherein the calcium-lean aqueous fluid is a produced water.

13. The method of claim 11, wherein the concentration of carbon dioxide in the gas before the formation of calcite is about 3 vol % to about 25 vol %.

14. The method of claim 11, wherein the concentration of carbon dioxide in the gas after the formation of calcite is less than about 3 vol %.

15. The method of claim 11, wherein the pH of the aqueous fluid before introducing the amount of slaked lime is about 6 to about 8.

16. The method of claim 11, wherein a concentration of slaked lime in the aqueous fluid is about 0.015 M or greater.

17. The method of claim 11, wherein the aqueous fluid further comprises magnesium, sodium, potassium, chloride, bicarbonate, sulfate, strontium, or any combination thereof.

18. The method of claim 11, wherein the gas is removed from the subterranean formation at a rate of about 5 MMSCFD to about 15 MMSCFD.

19. The method of claim 11, wherein a temperature inside the subterranean formation is about 50° C. to about 100° C.

20. The method of claim 11, wherein a pressure inside the subterranean formation is about 100 bar to about 300 bar.

* * * * *